US011609146B2

(12) United States Patent
Matsumoto et al.

(10) Patent No.: US 11,609,146 B2
(45) Date of Patent: Mar. 21, 2023

(54) FLUID CONTROL APPARATUS, DIAGNOSTIC METHOD AND PROGRAM RECORD MEDIUM FOR RECORDING PROGRAMS OF FLUID CONTROL APPARATUS

(71) Applicant: HORIBA STEC, Co., Ltd., Kyoto (JP)

(72) Inventors: Sota Matsumoto, Kyoto (JP); Kentaro Nagai, Kyoto (JP); Yuko Imasato, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 216 days.

(21) Appl. No.: 16/815,909

(22) Filed: Mar. 11, 2020

(65) Prior Publication Data
US 2020/0292407 A1    Sep. 17, 2020

(30) Foreign Application Priority Data

Mar. 12, 2019   (JP) .............................. JP2019-045190
Jun. 26, 2019   (JP) .............................. JP2019-118986

(51) Int. Cl.
*G01M 3/28* (2006.01)
*F16K 37/00* (2006.01)

(52) U.S. Cl.
CPC ....... *G01M 3/2876* (2013.01); *F16K 37/0066* (2013.01)

(58) Field of Classification Search
CPC .... F16K 37/00; F16K 37/005; F16K 37/0066; F16K 37/0075; F16K 37/0091
See application file for complete search history.

(56) References Cited

U.S. PATENT DOCUMENTS

| 4,043,355 | A | * | 8/1977 | Cerruti | G01M 3/2876 137/312 |
| 6,057,771 | A | * | 5/2000 | Lakra | G01M 3/2876 137/551 |
| 6,210,482 | B1 | * | 4/2001 | Kitayama | C23C 16/44 118/715 |
| 9,080,923 | B2 | * | 7/2015 | Quatmann | G01M 3/2876 |

(Continued)

FOREIGN PATENT DOCUMENTS

| JP | 2012099765 A |   | 5/2012 |         |
| JP | 2020-87164   | * | 6/2020 | F16K 37/00 |

OTHER PUBLICATIONS

Machine translation of JP 2020-87164 (Year: 2020).*

*Primary Examiner* — Natalie Huls
(74) *Attorney, Agent, or Firm* — Alleman Hall Creasman & Tuttle LLP

(57) ABSTRACT

In order to accurately judge whether or not there is a seat leakage in the first valve and the second valve in a short period of time, a fluid control apparatus comprises a fluid resistor arranged in a flow channel, a first valve arranged upstream of the fluid resistor, a first pressure sensor that measures a pressure in a first volume between the first valve and the fluid resistor in the flow channel, a second valve arranged downstream of the fluid resistor, a second pressure sensor that measures a pressure in a second volume between the fluid resistor and the second valve, a valve controller that controls the first or second valve, and a seat leakage judging part that judges whether or not there is a seat leakage in the valve valves based on the pressure sensors in a state where the valves are fully closed.

19 Claims, 14 Drawing Sheets

(56) References Cited

U.S. PATENT DOCUMENTS

| | | | |
|---|---|---|---|
| 9,080,924 B2* | 7/2015 | Welker | G01M 3/2876 |
| 9,841,122 B2* | 12/2017 | Kucera | F16K 37/0041 |
| 10,692,743 B2* | 6/2020 | Miyoshi | H01L 21/67109 |
| 10,801,916 B2* | 10/2020 | Ando | G01M 3/2815 |
| 2004/0144178 A1* | 7/2004 | Ohmi | G01F 1/50 |
| | | | 73/708 |
| 2010/0200083 A1* | 8/2010 | Kouchi | G01F 1/363 |
| | | | 137/486 |
| 2019/0242493 A1* | 8/2019 | Nishikawa | G05D 7/06 |
| 2020/0232873 A1* | 7/2020 | Nagase | G05B 23/02 |

* cited by examiner

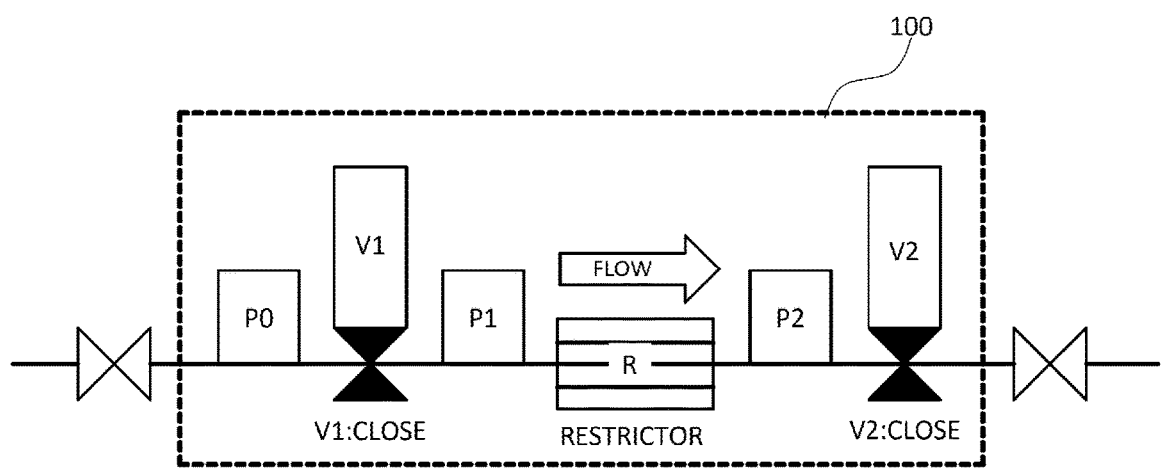
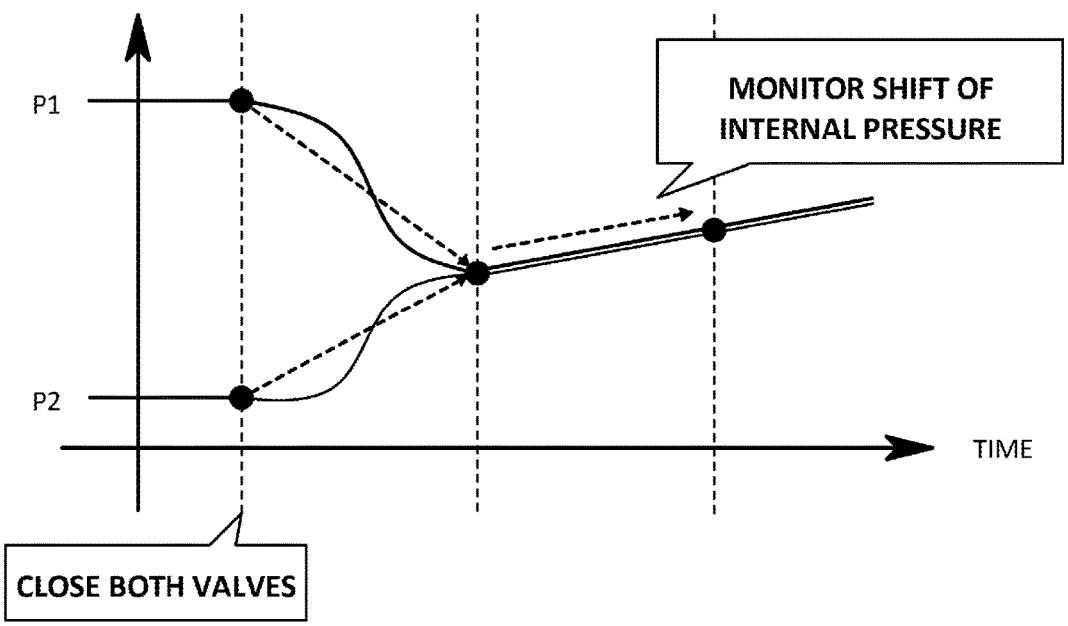
FIG. 2

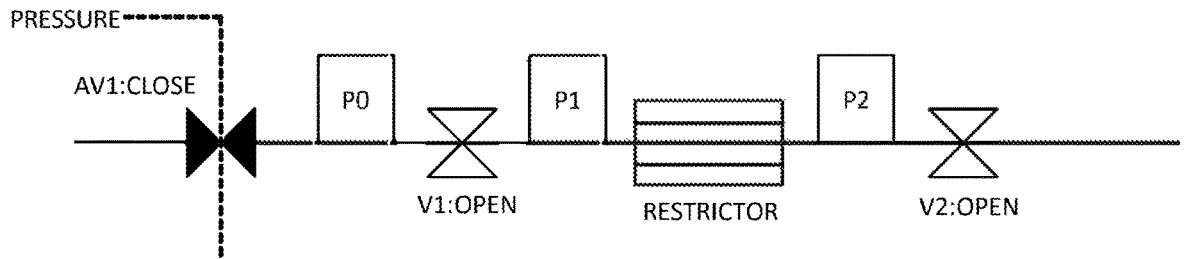
FIG. 11(a)   DIAGNOSIS ON ZERO POINT SHIFT IN EACH PRESSURE SENSOR
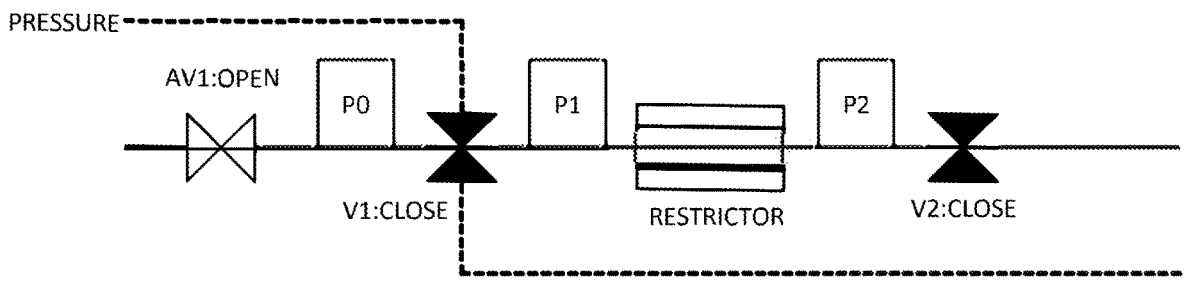
FIG. 11(b)   JUDGMENT OF SEAT LEAKAGE IN FIRST VALVE
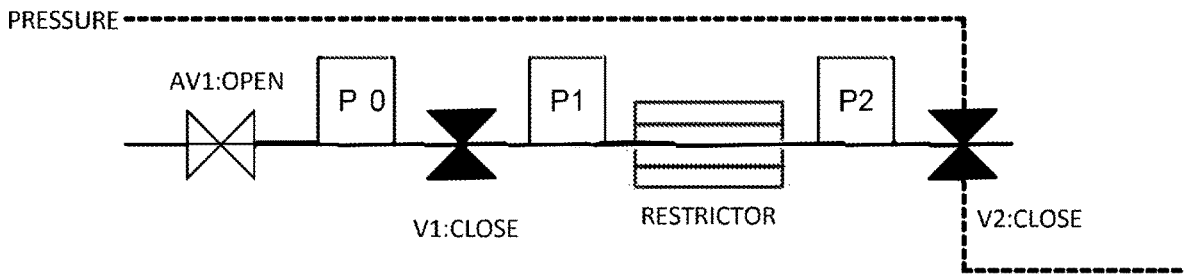
FIG. 11(c)   JUDGMENT OF SEAT LEAKAGE IN SECOND VALVE
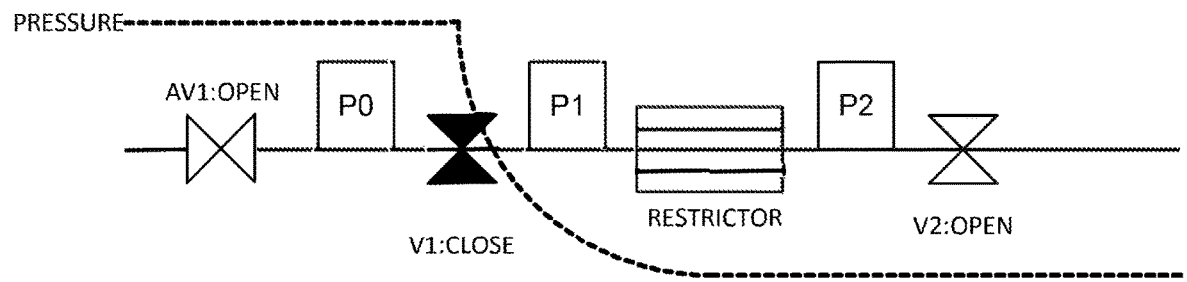
FIG. 11(d)   DIAGNOSIS ON RESISTOR FLOW RATE

FLUID CONTROL APPARATUS, DIAGNOSTIC METHOD AND PROGRAM RECORD MEDIUM FOR RECORDING PROGRAMS OF FLUID CONTROL APPARATUS

FIELD OF THE ART

This invention relates to a fluid control apparatus wherein a valve is provided for each of an upstream side and a downstream side of a fluid resistor respectively.

BACKGROUND ART

In a semiconductor manufacturing process such as an ALD (Atomic Layer Deposition) process to deposit one atomic layer, a process of supplying a gas to a chamber and a halt of supplying a gas to a chamber are repeated at a short cycle (refer to a patent document 1).

In order to make the flow rate of the gas follow at a set flow rate in a short period in this process used is a fluid control apparatus that controls the pressure and the flow rate of the gas respectively by each of two valves.

Meanwhile, it is also required for the above-mentioned fluid control apparatus not to flow the gas in the downstream side of the valve securely in a state wherein the valve is closed. This requires a periodic diagnosis conducted on the two valves respectively whether or not seat leakage occurs.

PRIOR ART DOCUMENTS

Patent Document

Patent Document 1
Japanese Unexamined Patent Application Publication No. 2012-99765

SUMMARY OF THE INVENTION

Problems Solved by the Invention

The present claimed invention intends to solve the above-mentioned problems and to provide a fluid control apparatus that can judge whether or not there is a seat leakage in the two valves in a short time with accuracy.

Means to Solve the Problems

More specifically, a fluid control apparatus in accordance with this invention comprises a fluid resistor arranged in a flow channel, a first valve arranged in an upstream side of the fluid resistor, a first pressure sensor that measures a pressure in a first volume between the first valve and the fluid resistor in the flow channel, a second valve arranged in a downstream side of the fluid resistor, a second pressure sensor that measures a pressure in a second volume between the fluid resistor and the second valve in the flow channel, a valve controller that controls the first valve or the second valve, and a seat leakage judging part that judges whether or not there is a seat leakage in the first valve and the second valve based on a pressure measured by the first pressure sensor and a pressure measured by the second pressure sensor in a state wherein the first valve and the second valve are fully closed by the valve controller.

In accordance with this arrangement, in case that the seat leakage occurs in the first valve or the second valve, it is possible to detect the seat leakage as a pressure change resulting from the fluid flowing into the first volume or the fluid flowing out from the second volume by the use of the first pressure sensor or the second pressure sensor.

In addition, since there is no need of conducting an operation for diagnosis on the first valve and the second valve respectively in order to detect the seat leakage in the first valve or the seat leakage in the second valve, it is possible to conduct the operation in a short period of time.

In order to make it possible to judge that the seat leakage occurs in which of the first valve or the second valve, it is preferable that the seat leakage judging part judges whether or not there is the seat leakage in the first valve and the second valve based on a change tendency of the pressure measured by the first pressure sensor or of the pressure measured by the second pressure sensor after the pressure measured by the first pressure sensor generally coincides with the pressure measured by the second pressure sensor. In addition, since whether or not there is the seat leakage in the first valve and the second valve is judged based on the change tendency, even though an error such as the zero point shift is contained in the measured pressure indicated by the first pressure sensor and the measured pressure indicated by the second pressure sensor, there is no chance of being influenced by the zero point shift.

As a concrete arrangement to detect the seat leakage in the first valve, represented is that the seat leakage judging part judges that the seat leakage occurs in the first valve in case that the pressure measured by the first pressure sensor or the second pressure sensor rises. In accordance with this arrangement, it is possible to detect that the seat leakage occurs in the first valve and to detect that the fluid flows in the first volume from the upstream side.

As a concrete arrangement to detect the seat leakage in the second valve, represented is that the seat leakage judging part judges that the seat leakage occurs in the second valve in case that the pressure measured by the first pressure sensor or the second pressure sensor drops. In accordance with this arrangement, it is possible to detect that the seat leakage occurs in the second valve and to detect that the fluid flows out from the second volume to the downstream side.

In order to make it possible to diagnose whether or not an error occurs in the measured pressure of the second pressure sensor, it is preferable to further comprise a diagnosis part that diagnoses the second pressure sensor based on the pressure measured by the second pressure sensor and a time change rate of the measured pressure in a state wherein the first valve is fully closed and the second valve is open by the valve controller.

As a concrete arrangement to diagnose the second pressure sensor, represented is that the diagnosis part diagnoses that a zero point shift does not occur in the second pressure sensor in case that both the time change rate of the pressure measured by the second pressure sensor is almost zero and the measured pressure is kept at a predetermined value.

In order to make it possible to diagnose whether or not an error occurs in the measured pressure of the first pressure sensor, it is preferable that the diagnosis part diagnoses the first pressure sensor based on the pressure measured by the first pressure sensor and the pressure measured by the second pressure sensor in a state wherein the first valve is open and the second valve is fully closed by the valve controller.

As a concrete arrangement to diagnose the first pressure sensor, represented is that the diagnosis part diagnoses that a zero point shift does not occur in the first pressure sensor in case that the pressure measured by the first pressure sensor is almost equal to the pressure measured by the second pressure sensor.

In order to improve reliability of the diagnosis by conducting the diagnosis on the first pressure sensor and the second pressure sensor in a state wherein it is guaranteed that no seat leakage occurs in the first valve and the second valve, it is preferable to further comprise a diagnosis trigger that makes the diagnosis part conduct a diagnosis on the first pressure sensor or the second pressure sensor only in case that the seat leakage judging part judges that no seat leakage occurs in the first valve and the second valve.

In order to make it possible to conduct a diagnosis simultaneously on multiple pressure sensors whether or not the zero point shift occurs in each of the multiple pressure sensors, it is preferable that a supply pressure sensor that measures a pressure in an upstream side of the first valve is further comprised, in a state wherein at least the first valve and the second valve are open and a preceding stage valve arranged in an upstream side of the supply pressure sensor is fully closed by the valve controller, the diagnosis part diagnoses that the zero point shift does not occur in each of the supply pressure sensor, the first pressure sensor and the second pressure sensor in case that each of the pressures measured by the supply pressure sensor, the first pressure sensor and the second pressure sensor is almost the same.

In order to secure the reliability of a judgment result whether or not there is the seat leakage in the first valve, it is preferable that in a state wherein at least the first valve and the second valve are fully closed and the preceding stage valve is open by the valve controller, the seat leakage judging part judges that the seat leakage occurs in the first valve in case that the pressure measured by the first pressure sensor or the pressure measured by the second pressure sensor rises. In accordance with this arrangement, it is possible to make the pressure in the upstream side of the second valve generally coincide with the pressure in the downstream side of the second valve while generating the differential pressure between the pressure in the upstream side of the first valve and the pressure in the downstream side of the first valve in order to judge whether or not there is the seat leakage. Accordingly, even though there is the seat leakage in the second valve, it is possible to make the amount of the gas flowing out from the volume between the first valve and the second valve through the second valve considerably subtle so that an influence on the judgment result about the seat leakage in the first valve can be ignored. In addition, it is also possible to secure that there is no influence of the error in each of the pressure sensors on the judgment result of the seat leakage in the first valve by previously conducting the diagnosis on the zero point shift of each pressure sensor.

In order to make it possible to improve the reliability on the judgment result whether or not there is the seat leakage in the second valve by making use of a situation wherein no seat leakage occurs in the first valve, it is preferable in a state wherein the first valve and the second valve are fully closed after a predetermined time period while the first valve is open and the second valve is fully closed by the valve controller, the seat leakage judging part judges that the seat leakage occurs in the second valve in case that the pressure measured by the first pressure sensor or the pressure measured by the second pressure sensor drops. In addition, in accordance with this arrangement, it is possible to make the pressure in the upstream side of the first valve generally coincide with the pressure in the downstream side of the first valve while generating a differential pressure between the upstream side of the second valve and the downstream side of the second valve to judge whether or not there is the seat leakage in the second valve. As a result of this, even if the seat leakage occurs in the first valve, or even if there is a seat leakage in the first valve that is less than or equal to a threshold value that is subtle enough not to be judged occurring the seat leakage, it is possible to make the amount of the fluid flowing from the upstream side into the volume between the first valve and the second valve considerably subtle so that an influence on the judgment result on the second valve can be ignored.

In order to make it possible to examine the flow rate in the fluid control apparatus by making use of the pressure in the fluid control apparatus after conducting the diagnosis on each of the pressure sensors and the judgment whether or not the seat leakage occurs in each of the valves, the fluid control apparatus may further comprise a resistor flow rate calculation part that calculates a resistor flow rate as being a flow rate of a fluid that flows in the fluid resistor based on the pressure measured by the first pressure sensor and the pressure measured by the second pressure sensor, in a state wherein the first valve is fully closed and the second valve is open by the valve controller, the diagnosis part examines the resistor flow rate calculated by the resistor flow rate calculation part based on the change of the pressure measured by the first pressure sensor.

In order to make it possible to display not only whether or not there is the abnormality such as the seat leakage but also a state how much the state is close to the abnormality even though no abnormality occurs, the seat leakage judging part may comprise a seat leakage calculating part that calculates a seat leakage amount in the first valve or a seat leakage amount in the second valve based on the pressure measured by the first pressure sensor or the pressure measured by the second pressure sensor, and a seat leakage comparing part that compares the seat leakage amount calculated by the seat leakage calculating part with a previously determined reference value and that outputs a judging result whether or not there is the seat leakage in the first valve or in the second valve, and the fluid control apparatus may further comprise an abnormality amount calculating part that comprises at least the seat leakage calculating part and that outputs an abnormality amount indicating a degree of the abnormality, and an abnormality judging part that comprises at least the seat leakage comparing part and that outputs whether or not there is the abnormality.

As a concrete arrangement to make it possible to display an abnormality progressing degree in each of the devices constituting the fluid control apparatus on the outside of the fluid control apparatus represented is the fluid control apparatus further comprising a resistor flow rate calculating part that calculates a resistor flow rate as being a flow rate of a fluid flowing in the fluid resistor based on the pressure measured by the first pressure sensor and the pressure measured by the second pressure sensor, wherein the abnormality calculating part further comprises a sensor shift calculating part that calculates a zero point shift amount of the first pressure sensor or a zero point shift amount of the second pressure sensor based on the pressure measured by the first pressure sensor or the pressure measured by the second pressure sensor, and a flow rate accuracy calculating part that calculates a flow rate accuracy of the resistor flow rate based on the resistor flow rate calculated by the resistor flow rate calculating part and the reference flow rate calculated from the pressure measured by the first pressure sensor or the pressure measured by the second pressure sensor.

In accordance with a fluid control system comprising multiple fluid control apparatuses of this invention and a state displaying part that obtains the abnormality amount output by each of the abnormality amount calculating parts of the multiple fluid control apparatuses or that obtains whether or not there is the abnormality output by each of the abnormality judging parts and that lists the abnormality amount for each of the fluid control apparatuses or whether or not there is the abnormality for each of the fluid control apparatuses, it is possible for a user to easily grasp not only in which fluid control apparatus an abnormality occurs in a fluid control system comprising multiple fluid control apparatuses but also how much the abnormality progresses by referring to the output of the state displaying part.

A diagnostic method in accordance with this invention is a diagnostic method of a fluid control apparatus comprising a fluid resistor arranged in a flow channel, a first valve arranged in an upstream side of the fluid resistor, a first pressure sensor that measures a pressure in a first volume between the first valve and the fluid resistor in the flow channel, a second valve arranged in a downstream side of the fluid resistor, and a second pressure sensor that measures a pressure in a second volume between the fluid resistor and the second valve in the flow channel, and comprises a valve control step to fully close the first valve and the second valve, and a seat leakage judging step to judge where or not there is a seat leakage in the first valve and the second valve based on a pressure measured by the first pressure sensor and a pressure measured by the second pressure sensor. In accordance with this method, it is possible to accurately judge whether or not there is the seat leakage in each of the valves in a short period of time.

In order to make it possible to enjoy the effect that is the same as that of the fluid control apparatus in accordance with this invention by updating programs of an existing fluid control apparatus, a program may be used; the program is used for a fluid control apparatus comprising a fluid resistor arranged in a flow channel, a first valve arranged in an upstream side of the fluid resistor, a first pressure sensor that measures a pressure in a first volume between the first valve and the fluid resistor in the flow channel, a second valve arranged in a downstream side of the fluid resistor, and a second pressure sensor that measures a pressure in a second volume between the fluid resistor and the second valve in the flow channel, and the program makes a computer serve as functions of a valve controller that controls the first valve and the second valve and a seat leakage judging part that judges whether or not there is a seat leakage in the first valve or the second valve based on a pressure measured by the first pressure sensor and a pressure measured by the second pressure sensor in a state wherein the first valve and the second valve are fully closed by the valve controller.

The program for the fluid control apparatus may be electronically distributed, and may be recorded in a program record medium such as a CD, a DVD and a flash memory.

Effect of the Invention

In accordance with the fluid control apparatus of this invention, it is possible to judge whether or not there is the seat leakage in the first valve and the second valve in a short period of time by detecting the pressure change generating at a time when the seat leakage occurs in the first valve and the second valve by the use of the first pressure sensor or the second pressure sensor.

BRIEF DESCRIPTION OF THE DRAWINGS

FIG. 2 A pattern diagram showing a judgment example of a seat leakage in accordance with the first embodiment.

FIGS. 11(a) to (d) A pattern diagram showing a pressure change in the fluid control apparatus at a time of a series of diagnoses and test in accordance with the second embodiment.

MODE FOR EMBODYING THE INVENTION

A fluid control apparatus 100 in accordance with a first embodiment of this invention will be explained with reference to each drawing.

The fluid control apparatus 100 is used for supplying a gas as being a fluid at a set flow rate to a chamber inside of which is kept at a predetermined vacuum degree, for example, in a semiconductor manufacturing process. The set flow rate is a step signal that rises or drops from a certain flow rate value to another flow rate value in a stepwise shape. The fluid control apparatus 100 is so configured to follow the step signal to satisfy a quality of a semiconductor to be manufactured within a predetermined time period.

Figure 1:
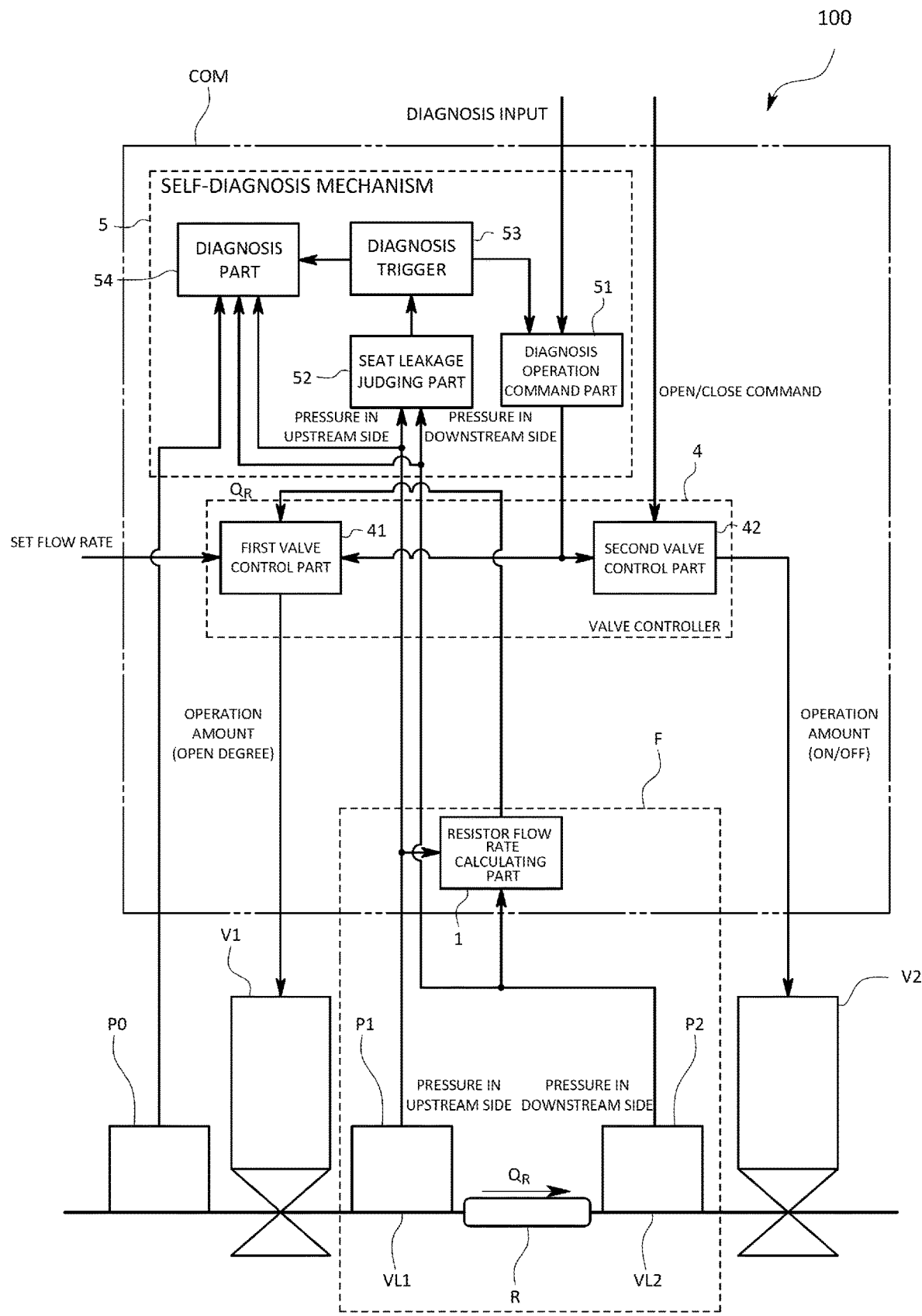
FIG. 1 A pattern diagram showing a fluid control apparatus in accordance with a first embodiment of this invention.

More specifically, the fluid control apparatus 100 comprises, as shown in FIG. 1, a sensor arranged in a flow channel, a fluid device comprising a valve and a control operation machine (COM) to control the fluid device.

A supply pressure sensor (P0), a first valve (V1), a first pressure sensor (P1), a fluid resistor (R), a second pressure sensor (P2) and a second valve (V2) are arranged in the flow channel from the upstream side in sequence. The fluid resistor (R) is, for example, a laminar flow element, and a flow rate of the gas generates in the fluid resistor (R) in accordance with a differential pressure between an upstream side and a downstream side of the fluid resistor (R).

The supply pressure sensor (P0) is to monitor a pressure of the gas supplied from the upstream side. In case that it is certified that the supply pressure is stable, the supply pressure sensor (P0) may be omitted.

The first pressure sensor (P1) measures the pressure (hereinafter also called as the upstream side pressure) of the gas charged inside of a first volume (VL1) as being a volume of the flow channel between the first valve (V1) and the fluid resistor (R).

The second pressure sensor (P2) measures the pressure (hereinafter also called as the downstream side pressure) of the gas charged inside of a second volume (VL2) as being a volume of the flow channel between the second valve (V2) and the fluid resistor (R).

As mentioned, the first pressure sensor (P1) measures the pressure of the first volume (VL1) as being a volume formed by the first valve (V1) and the fluid resistor (R), and the second pressure sensor (P2) measures the pressure of the second volume (VL2) as being a volume formed by the fluid resistor (R) and the second valve (V2). In addition, in other words, the first pressure sensor (P1) and the second pressure sensor (P2) measure each of the pressures in each volume arranged in the upstream and the downstream of the fluid resistor (R) respectively.

The first valve (V1) and the second valve (V2) are the same type in this embodiment, and a piezoelectric valve wherein a valve body is driven to a valve seat by, for example, a piezoelectric element. The first valve (V1) controls the flow rate based on the pressure in the upstream side measured by the first pressure sensor (P1) and a resistor flow rate ($G_R$) calculated based on the pressure in the downstream side measured by the second pressure sensor (P2). On the other hand, the second valve (V2) arranged in the most downstream side of the fluid device constituting the fluid control apparatus 100 controls on/off of the gas flowing out from the fluid control apparatus 100. The second valve (V2) in this embodiment is controlled to take either a fully closed state or a fully open state, however, the second valve (V2) may be controlled to take not only the fully open state or fully closed state similar to the first valve (V1) but also an arbitrary open state between the fully closed state and the fully open state.

Next, the control operation machine (COM) will be explained in detail. The control operation machine (COM) is, so called, a computer comprising, for example, a CPU, a memory, an A/D and D/A convertors and an input/output devices, and produces functions as a resistor flow rate calculation part 1 mainly administrates a function of flow rate control and a valve controller 4 comprising a first valve control part 41 and a second valve control part 42 by cooperatively operating each device by executing programs for the fluid control apparatus 100 stored in the memory. In addition, the control operation machine (COM) also produces a function as a self-diagnosis mechanism 5 comprising a diagnosis operation command part 51, a seat leakage judging part 52, a diagnosis trigger 53 and a diagnosis part 54.

First, each part relating to the flow rate control will be described in detail. A resistor flow rate calculation part 1 constitutes a flow rate measuring mechanism (F) as being, so called, a pressure type flow rate sensor together with the first pressure sensor (P1), the fluid resistor (R) and the second pressure sensor (P2). In other words, the resistor flow rate calculation part 1 calculates and outputs the resistor flow rate ($Q_R$) as being the fluid flow rate flowing in the fluid resistor (R) with the upstream side pressure measured by the first pressure sensor (P1), the downstream side pressure measured by the second pressure sensor (P2) and a temperature of a fluid or an ambient environment measured by a temperature sensor as an input. A calculation formula of the flow rate used by the resistor flow rate calculation part 1 may be an existing formula.

The first valve control part 41 controls the first valve (V1) based on a set flow rate set by a user at least at a time of an ordinary operation and the resistor flow rate ($Q_R$) calculated by the resistor flow rate calculation part 1. More specifically, the first valve control part 41 conducts a flow rate feed-back control so as to make a deviation between the set flow rate and the resistor flow rate ($Q_R$) small.

The second valve control part 42 switches the second valve (V2) to either one of the fully closed state and the open state based on an open/close command signal set by the user at least at a time of the ordinary operating time. For example, the open/close command signal is an ON signal indicating a supply period while the gas is supplied to the chamber by opening the second valve (V2), an OFF signal indicating a halt period while the gas is halted to be supplied to the chamber by closing the second valve (V2) and an ON/OFF signal while the ON signal and the OFF signal are periodically repeated. A cycle of the open/close signal is set in accordance with a length of the period while the gas is supplied and a length of the period while the gas supply is halted in, for example, an ALD process or the like. The set flow rate of the gas set by the first valve control part 41 is kept at a flow rate value of the gas to be flown into the chamber during the supplying period, for example, irrespective of the OPEN/CLOSE signal.

Next, the self-diagnosis mechanism 5 will be explained. The self-diagnosis mechanism 5 checks the seat leakage in the first valve (V1) and the second valve (V2) and diagnoses the first pressure sensor (P1) and the second pressure sensor (P2). More concretely, the self-diagnosis mechanism 5 is so configured to conduct diagnosis on the first pressure sensor (P1) and the second pressure sensor (P2) only in a case that no seat leakage exists in the first valve (V1) and the second valve (V2). Each part of the self-diagnosis mechanism 5 will be explained.

The diagnosis operation command part 51 inputs a fully close command or an open command as being a command different from the set pressure and the set flow rate into the first valve control part 41 and the second valve control part 42 in case the self-diagnosis mechanism 5 receives the diagnosis initiation command input by, for example, a user. The first valve (V1) and the second valve (V2) operate almost the same as that of the on/off valve by the fully close command and the open command. First, the diagnosis operation command part 51 inputs the fully close command to the first valve control part 41 and the second valve control part 42 respectively in order to check whether or not there is the seat leakage in the first valve (V1) and the second valve (V2). In addition, the diagnosis operation command part 51 inputs the fully close command only to one of the first valve control part 41 and the second valve control part 42, and inputs the open command to the other in case that it is judged that there is no seat leakage in the first valve (V1) and the second valve (V2).

The seat leakage judging part 52 judges whether or not there is the seat leakage in the first valve (V1) and the second valve (V2) based on the pressure measured by the first pressure sensor (P1) and the pressure measured by the second pressure sensor (P2) in a state wherein the first valve (V1) and the second valve (V2) are fully closed by the valve controller 4. In this embodiment, as shown in FIG. 2, the seat leakage judging part 52 judges whether or not there is the seat leakage in the first valve (V1) and the second valve (V2) based on a time change of each pressure measured by the first pressure sensor (P1) and the second pressure sensor (P2) when a predetermined stand-by time elapses after the first valve (V1) and the second valve (V2) are fully closed. The starting time of the judgment when the seat leakage check in the first valve (V1) and the second valve (V2) is initiated after the first valve (V1) and the second valve (V2) are fully closed may refer to a time when the pressure measured by the first valve (V1) generally coincides with the pressure measured by the second valve (V2), or may be set only by the elapsed time after the first valve (V1) and the second valve (V2) are fully closed. If the starting time of the seat leakage judgment is judged only by the elapsed time, it is possible to prevent a situation that the pressure measured by the first pressure sensor (P1) does not coincide with the pressure measured by the second pressure sensor (P2) so that checking the seat leakage is not initiated because a zero point shift occurs for either of the first pressure sensor (P1) or the second pressure sensor (P2)

Concretely, the seat leakage judging part 52 judges that the seat leakage occurs in the first valve (V1) in case that both pressures measured by the first pressure sensor (P1) and the second pressure sensor (P2) rise. This is based on that the gas flows in the first volume (VL1) through the first valve (V1) from the upstream side so that the pressure rise occurs in the first volume (VL1) and the second volume (VL2) in case that the seat leakage occurs in the first valve (V1).

On the other hand, the seat leakage judging part 52 judges that the seat leakage occurs in the second valve (V2) in case that both pressures measured by the first pressure sensor (P1) and the second pressure sensor (P2) drop. This is based on that the gas flows out from the second volume (VL2) through the second valve (V2) to the downstream side so that the pressure drop occurs in the first volume (VL1) and the second volume (VL2) in case that the seat leakage occurs in the second valve (V2).

In addition, in case that the pressure measured by the first pressure sensor (P1) and the pressure measured by the second pressure sensor (P2) change only within a predetermined range after the pressure measured by the first pressure sensor (P1) generally coincides with the pressure measured by the second pressure sensor (P2), the seat leakage judging part 52 judges that no seat leakage occurs in the first valve (V1) and the second valve (V2). In addition, the seat leakage judging part 52 sends a data indicating the judgment result to the diagnosis trigger 53.

The diagnosis trigger 53 makes a diagnosis part 54, to be described later, conduct the diagnosis on the first pressure sensor (P1) and the second pressure sensor (P2) only in case that the seat leakage judging part 52 judges no seat leakage occurs for either the first valve (V1) or the second valve (V2).

The diagnosis part 54 diagnoses the first pressure sensor (P1) and the second pressure sensor (P2) based on the pressure measured by the first pressure sensor (1) and the pressure measured by the second pressure sensor (P2). In this embodiment, the diagnosis part 54 diagnoses whether or not the zero point shift occurs in the first pressure sensor (P1) or the second pressure sensor (P2) based on each of the pressures measured by the first and second pressure sensors (P1) and (P2).

Figure 3:
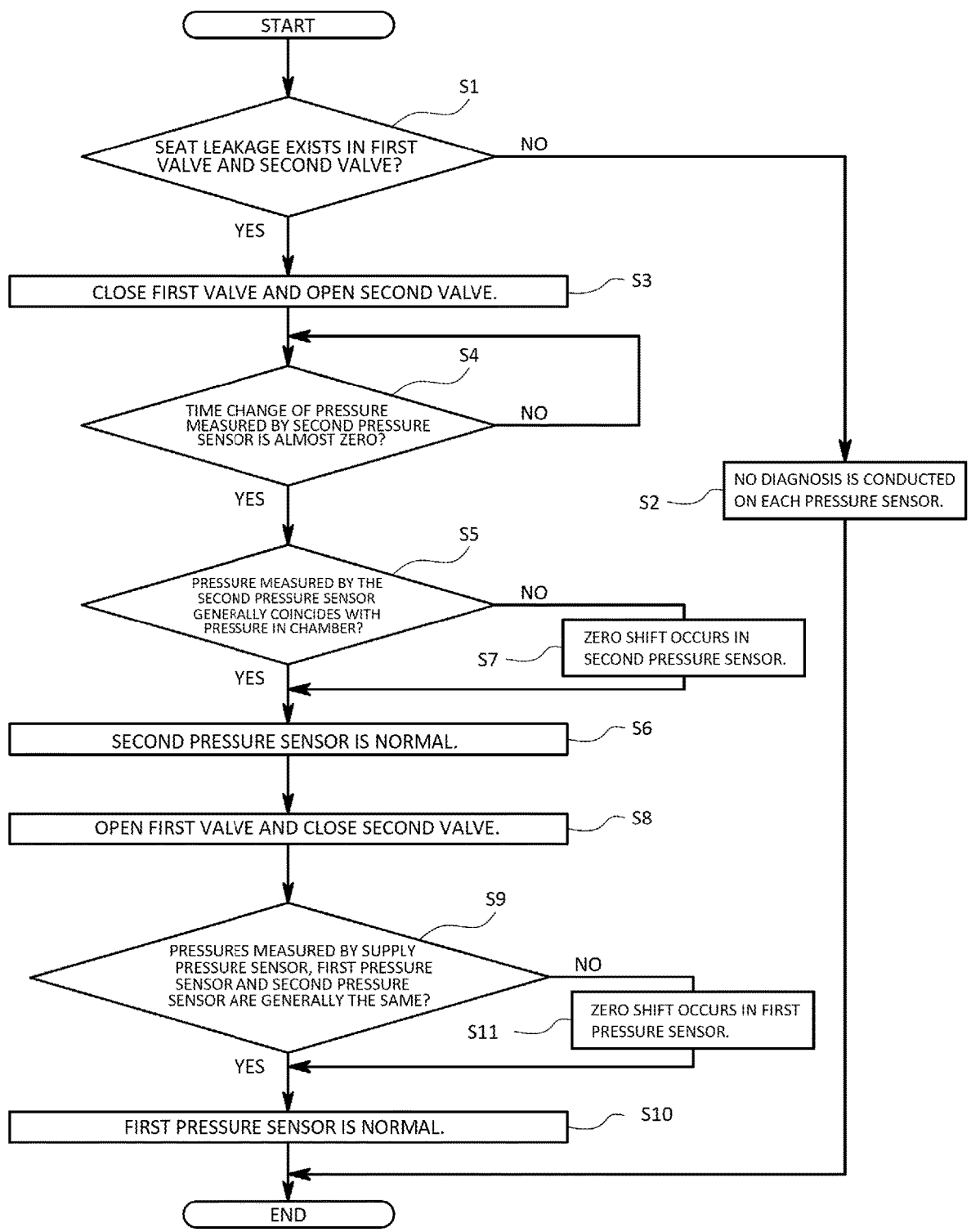
FIG. 3 A flow chart showing a diagnosis step of each pressure sensor in accordance with the first embodiment.
Figure 4:
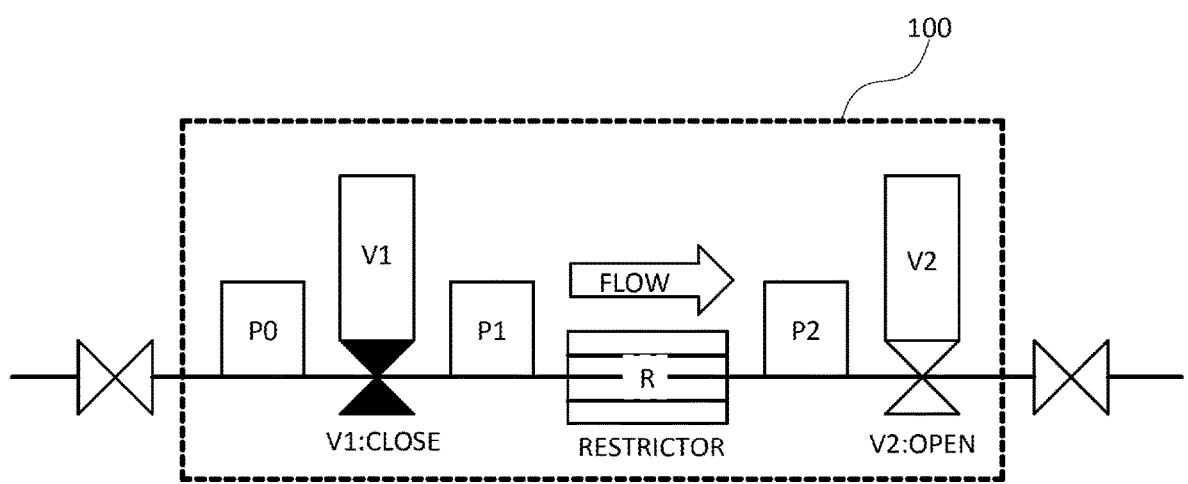
FIG. 4 A pattern diagram showing a state of the fluid control apparatus at a time of diagnosing a second pressure sensor in accordance with the first embodiment.

The diagnosis trigger 64 and the diagnosis part 54 will be explained in detail with reference to a flow chart in FIG. 3, and pattern diagrams in FIG. 4 and FIG. 5.

The diagnosis trigger 53 obtains the data regarding the judgment result from the seat leakage judging part 52 and outputs a diagnosis permission signal to the diagnosis part 54 only in case that no seat leakage occurs in both the first valve (V1) and the second valve (V2) (step S1). On the other hand, the diagnosis trigger 53 does not output the diagnosis permission signal in case the judgment result indicates that the seat leakage occurs in the first valve (V1) or the second valve (V2). As a result of this, the diagnosis part 54 does not conduct the diagnosis on the first pressure sensor (P1) and the second pressure sensor (P2) (step S2).

In case that no seat leakage occurs in both the first valve (V1) and the second valve (V2), the diagnosis trigger 53 makes the diagnosis operation command part 51 output the diagnosis operation command to the valve controller 4. In this embodiment, the diagnosis is conducted on the first pressure sensor (P1) after the diagnosis is conducted on the second pressure sensor (P2). More specifically, as shown in FIG. 4, the valve controller 4 first opens the second valve (V2) and makes the first valve (V1) in a closed state (step S3).

With this state kept, the diagnosis part 54 initiates the diagnosis on the second pressure sensor (P2). First, the diagnosis part 54 judges whether or not a time change rate of the pressure measured by the second pressure sensor (P2) becomes almost zero and the pressure is stabilized at a certain value (step S4). The diagnosis part 54 judges whether or not the pressure measured by the second pressure sensor (P2) is generally equal to the pressure in the chamber, namely the vacuum pressure (step S5). "Generally equal" means a state wherein a difference between the pressure measured by the second pressure sensor (P2) and the vacuum pressure is only within a previously determined threshold value. In case that the pressure measured by the second pressure sensor (P2) is generally the same as the vacuum pressure, the diagnosis part 54 diagnoses that the second pressure sensor (P2) is normal (step S6). In addition, in case that the pressure measured by the second pressure sensor (P2) does not coincide with the vacuum pressure and is bigger than the previously determined threshold value, diagnosis part 54 diagnoses that the zero point shift occurs in the second pressure sensor (P2) (step S7). The zero point calibration of the second pressure sensor (P2) may be conducted based on the zero point shift amount obtained in the step S7.

Figure 5:
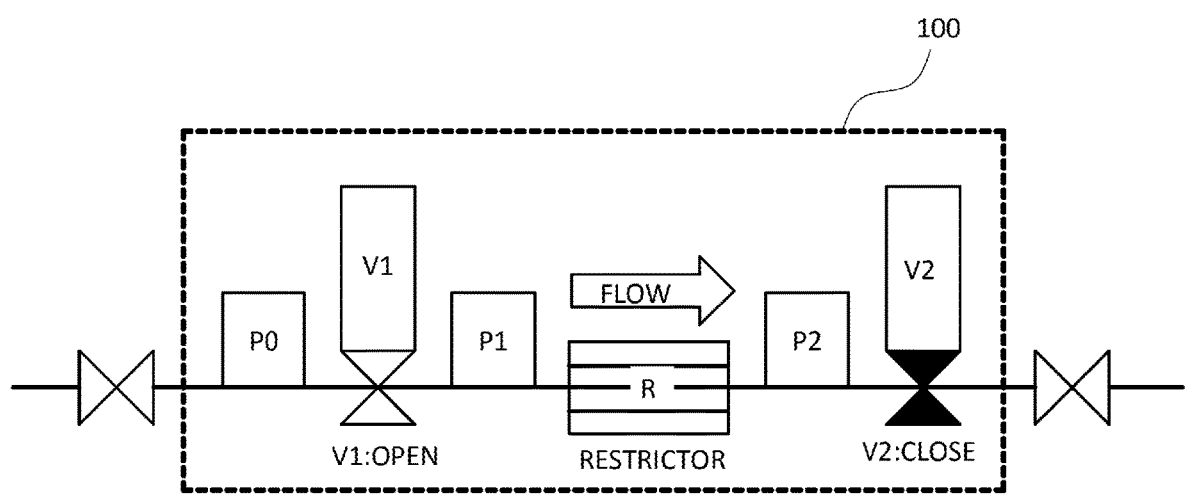
FIG. 5 A pattern diagram showing a state of the fluid control apparatus at a time of diagnosing a first pressure sensor in accordance with the first embodiment.

After completion of the diagnosis of the second pressure sensor (P2), the diagnosis trigger 53 makes the diagnosis operation command part 51 output the diagnosis operation command to open the first valve (V1) and to close the second valve (V2) to the valve controller 4 so as to make the state shown in FIG. 5 (step S8).

Next, the diagnosis part 54 judges whether or not the pressure measured by the supply pressure sensor (P0), the pressure measured by the first pressure sensor (P1) and the pressure measured by the second pressure sensor (P2) are generally the same (step S9). In this step also, if the difference between each pressure is within a predetermined threshold value, it is determined that the pressures are generally the same.

In case that each of the pressures measured by the supply pressure sensor (P0), the first pressure sensor (P1) and the second pressure sensor (P2) is generally the same, the diagnosis part 54 diagnoses that the first pressure sensor (P1) is normal. In case that each of the pressures is not the same, the diagnosis part 54 diagnoses that the zero point shift occurs in the first pressure sensor (P1) (step S11).

In accordance with the fluid control apparatus 100 of this embodiment having the above arrangement, it is possible to simultaneously judge whether or not there is the seat leakage in the first valve (V1) for controlling the pressure and the second valve (V2) for controlling the flow rate.

In addition, since whether or not there is the seat leakage is judged based on a change tendency of each of the measured pressures after the pressure in a volume from the first valve (V1) to the second valve (V2) is stabilized, even though the zero point shift occurs in the first pressure sensor (P1) or the second pressure sensor (P2), there is no chance of being influenced by the zero point shift.

Furthermore, since the diagnosis part 54 diagnoses the first pressure sensor (P1) and the second pressure sensor (P2) only in a state wherein no seat leakage occurs in the first valve (V1) and the second valve (V2), it is possible to prevent the diagnosis result from being unreliable caused by the seat leakage. Accordingly, it is possible to diagnose both the first pressure sensor (P1) and the second pressure sensor (P2) with high responsibility.

In addition, it is possible to judge whether or not the seat leakage occurs, to diagnose the first pressure sensor (P1) and the second pressure sensor (P2) by using only a fluid device to conduct the pressure control and the flow rate control. Then, there is no need of providing a sensor separately in order to conduct the diagnosis.

The fluid control apparatus 100 in accordance with a second embodiment of this invention will be explained with reference to FIG. 6~FIGS. 11(a) to (d). The same parts as those in the second embodiment are denoted by the same reference numerals as those in the first embodiment.

The fluid control apparatus 100 in the second embodiment has almost the same arrangement as that of the fluid control apparatus 100 shown in FIG. 1, however, the arrangement differs from that of the first embodiment in that the diagnosis part 54 diagnoses the zero point shift in the supply pressure sensor (P0) and diagnoses the resistor flow rate to be calculated. In addition, the operation of the valve controller 4 to conduct the diagnosis is also different.

Figure 6:
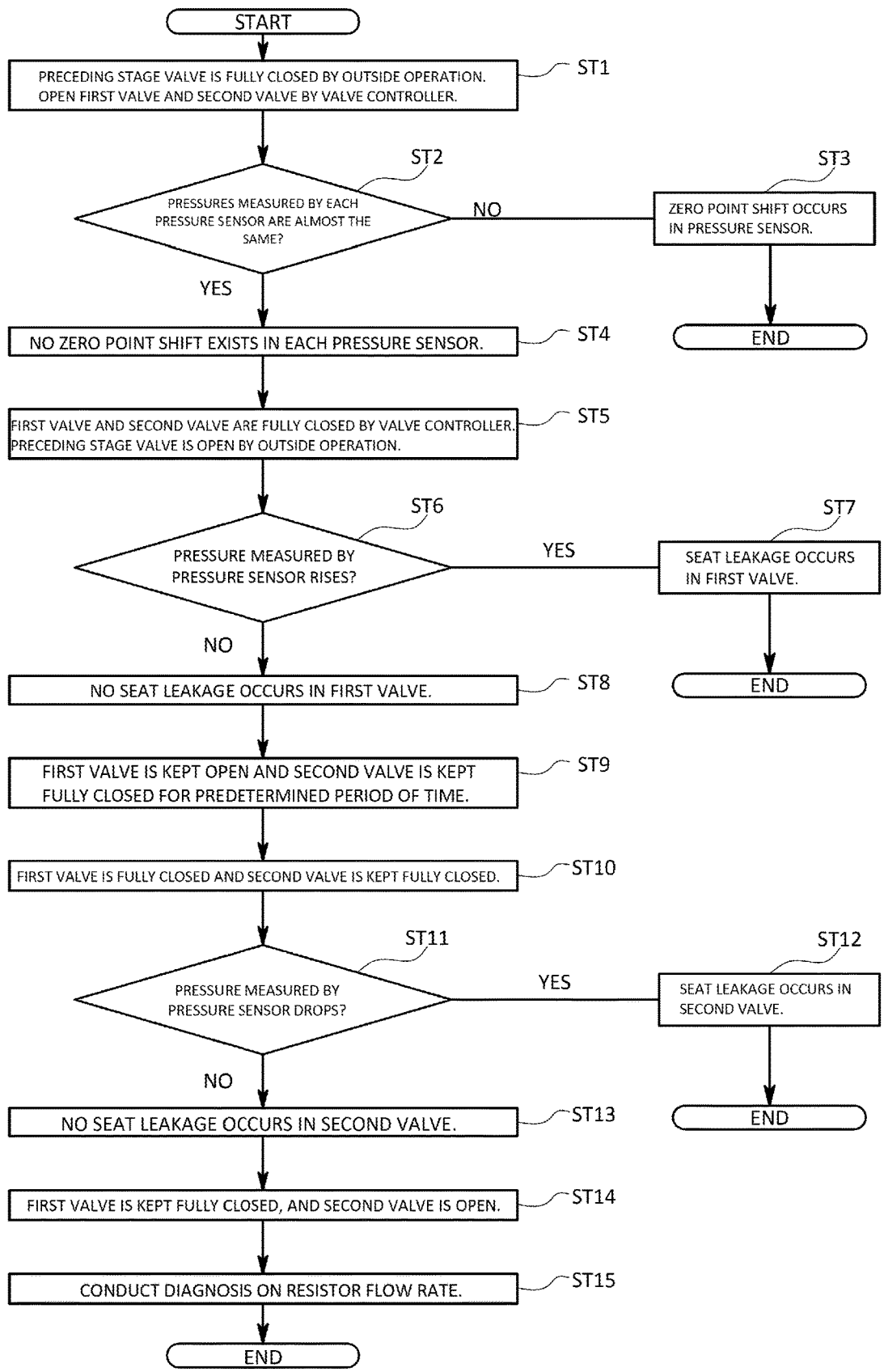
FIG. 6 A flow chart showing a diagnosis and a judgment example in accordance with a second embodiment of this invention.

Concretely, as shown in a flow chart in FIG. 6, the fluid control apparatus 100 of the second embodiment conducts; (a) diagnosis of the zero point shift in each of the three pressure sensors, (b) judgment on the seat leakage in the first valve (V1), (c) judgment on the seat leakage in the second valve (V2), and (d) diagnosis of the resistor flow rate in this order. Each of four steps will be explained in detail.

Figure 7:
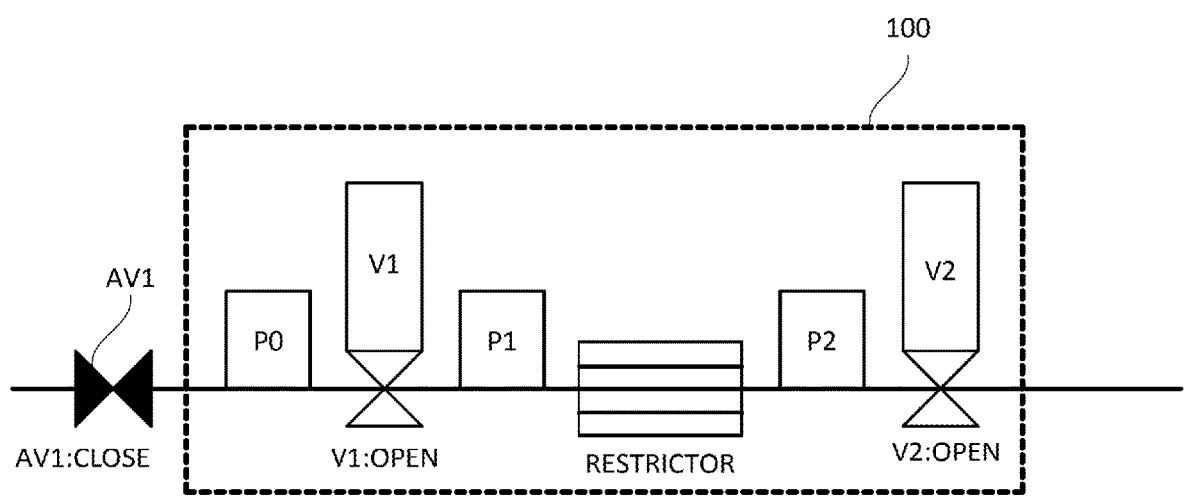
FIG. 7 A pattern diagram showing a state of the fluid control apparatus at a time of diagnosing each pressure sensor in accordance with the second embodiment.

Before the diagnosis part 54 conducts the diagnosis of the zero point shift on each of the three pressure sensors (P0), (P1), (P2), in a state that a preceding stage valve (AV1) arranged in the upstream side of the fluid control apparatus 100, as shown in FIG. 6 and FIG. 7, is fully closed, the valve controller 4 opens the first valve (V1) and the second valve (V2) and a predetermined period of time is waited until the gas is discharged from each volume of the fluid control apparatus 100 so as to be in the vacuum state (step ST1). The preceding stage valve (AV1) is controlled to open or close by an operation of the preceding stage valve (AV1) by a user or a command of a controller that controls each device that integrates all of the processes. In addition, the gas in the fluid control apparatus 100 is sucked by a vacuum source such as a chamber connected to the downstream side of the second valve (V2). When evacuation is conducted by the vacuum source, since the fluid resistor (R) is arranged in a space in the upstream side of the fluid resistor (R), there may be a case that it takes time until the evacuation is completely finished for the space in the upstream side of the fluid resistor (R). Then, evacuation may be conducted through an evacuation flow channel (not shown in drawings) that bifurcates between the fluid control apparatus 100 and the preceding stage valve (AV1) in order to shorten time to evacuate the volume in the upstream side of the fluid resistor (R).

After the gas is completely evacuated to be vacuum from the volume between the preceding stage valve (AV1) and the first volume (VL1) and the second volume (VL2) of the fluid control apparatus 100, the diagnosis part 54 judges whether or not each of the pressures measured by the supply pressure sensor (P0), the first pressure sensor (P1) and the second pressure sensor (P2) indicates almost zero and each of the pressures is equal within a predetermined permissible difference (step ST2). As mentioned above, since the zero point shift is diagnosed in a state wherein the first valve (V1) and the second valve (V2) are open, even though the seat leakage occurs in each of the valves (V1), (V2), the diagnosis result is not influenced by the seat leakage.

In case that the pressures measured by the pressure sensors differ from each other over the permissible difference, the diagnosis part 54 judges that the zero point shift occurs in the pressure sensor that outputs the biggest measured pressure. In addition, the diagnosis trigger 53 does not permit the subsequent judgment of the seat leakage and the subsequent diagnosis of the resistor flow rate, and the diagnosis is terminated (step ST3).

Meanwhile, in case that each pressure is equal, the diagnosis part 54 diagnoses that the zero point shift does not occur in the supply pressure sensor (P0), the first pressure sensor (P1) and the second pressure sensor (P2) (step ST4). In this case, the diagnosis part 53 permits initiation of the diagnosis of the seat leakage in the first valve (V1).

Figure 8A:
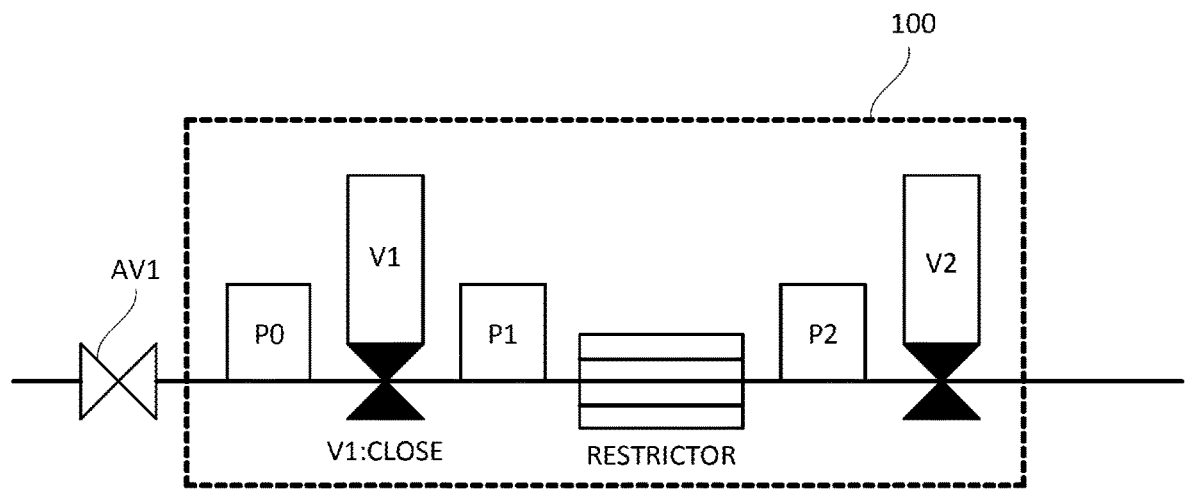
FIGS. 8(a) and (b) A pattern diagram showing a state of the fluid control apparatus at a time of diagnosing the first valve in accordance with the second embodiment.

In case that the next judgment of the seat leakage in the first valve (V1) is permitted by the diagnosis trigger 53, as shown in FIG. 6 and FIG. 8(a), the first valve (V1) and the second valve (V2) are fully closed by the valve controller 4. In addition, the preceding stage valve (AV1) is open by the operation of the user or a command of the controller that integrates all of the processes (step ST5). More specifically, the volume between the first valve (V1) and the second valve (V2) of the fluid control apparatus 100 is in a state of being kept generally vacuum so that the supply pressure of the gas is applied to the upstream side of the first valve (V1).

With this state kept, the seat leakage judging part 52 judges whether or not there is the seat leakage in the first valve (V1) based on whether or not the pressure measured by the first pressure sensor (P1) or the second pressure sensor (P2) rises within a predetermined period of time (step ST6). Since the upstream side and the downstream side of the second valve (V2) are kept generally in the vacuum state, even though the leakage occurs in the second valve (V2), an amount of the gas flowing out from the first valve (V1) to the second valve (V2) is extremely small. As this result, it is possible to substantially ignore the influence of whether or not there is the seat leakage in the second valve (V2) on the judgment in the step (ST6).

Figure 8B:
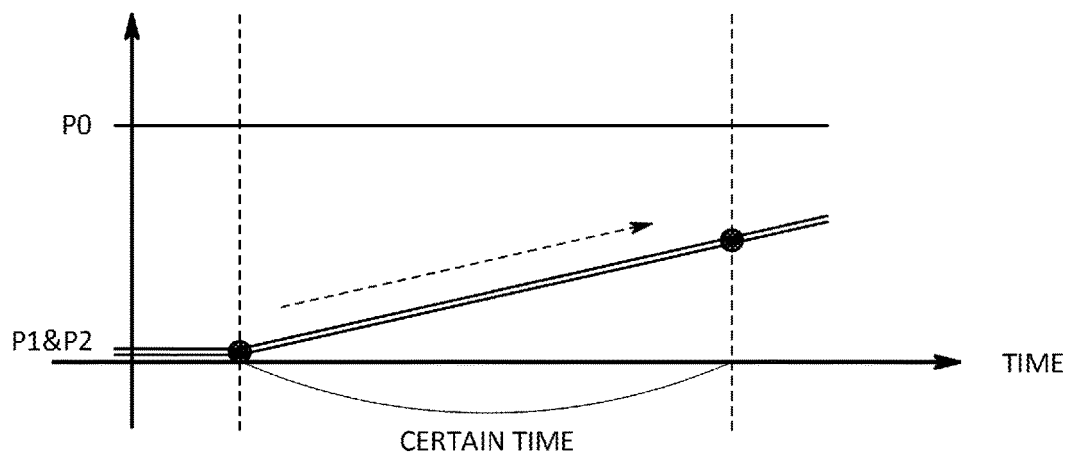

In case that the pressure measured by the first pressure sensor (P1) or the second pressure sensor (P2) is detected to rise as shown in FIG. 8(b), the seat leakage judging part 52 judges that the seat leakage occurs in the first valve (V1) (step ST7). This is because the pressure rises because the gas flows from the upstream side of the first valve (V1) into the inside of the fluid control apparatus 100, in case that the seat leakage occurs in the first valve (V1).

On the other hand, in case that no rise of the pressure measured by either of the first pressure sensor (P1) and the second pressure sensor (P2) is detected in the predetermined period of time, the seat leakage judging part 52 judges that no seat leakage occurs in the first valve (V1) (step ST8). In this case, the diagnosis trigger 53 permits a subsequent judging operation of the seat leakage in the second valve (V2).

Figure 9A:
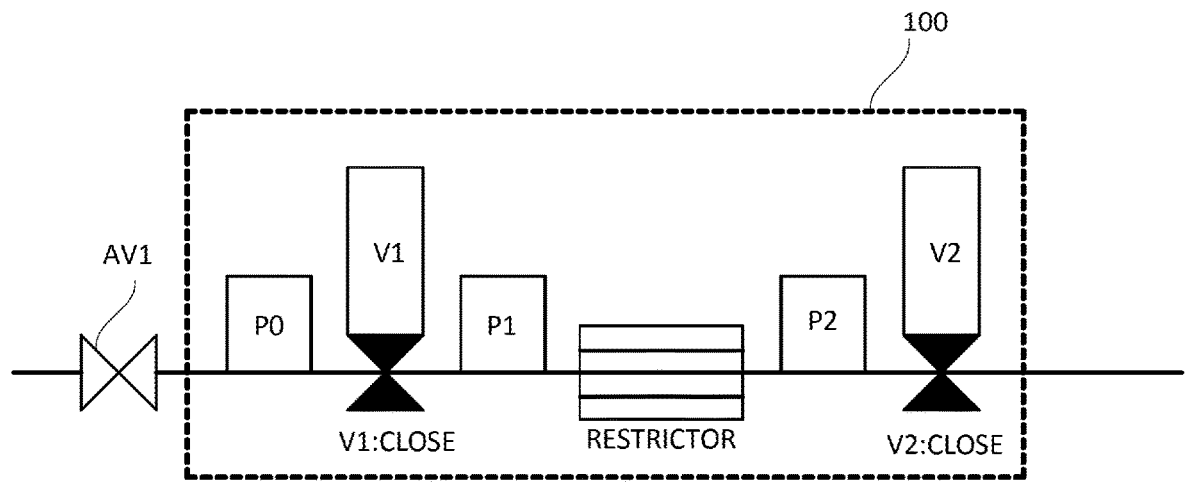
FIGS. 9(a) and (b) A pattern diagram showing a state of the fluid control apparatus at a time of diagnosing the second valve in accordance with the second embodiment.

Next, the valve controller 4 releases the first valve (V1) from the fully closed state to open as shown in FIG. 6, and waits for a predetermined period until the gas is charged with a predetermined pressure into the volume of the fluid control apparatus 100 in a state of keeping the second valve (V2) in the fully closed state (step ST9). Later, as shown in FIG. 6 and FIG. 9(a), the valve controller 4 fully closes the first valve (V1) again (step ST10).

Then, the seat leakage judging part 52 judges whether or not there is the seat leakage in the second valve (V2) based on whether or not the pressure measured by the first pressure sensor (P1) or the second pressure sensor (P2) drops (step ST11). While a necessary differential pressure is formed between the upstream side and the downstream side of the second valve (V2) in order to judge whether or not there is the seat leakage in the second valve (V2), the pressure in the upstream side of the first valve (V1) and the pressure in the downstream side of the first valve (V1) are kept at generally the same predetermined pressure. As a result of this, if the seat leakage occurs in the first valve (V1) after the judgment of the step (ST6), or if a subtle leakage occurs that is judged to be no seat leakage at a time of the judgment of step (ST6), it is possible to make the amount of the gas flowing into the volume considerably subtle so that an influence on the judgment in step (S11) can be ignored.

Figure 9B:
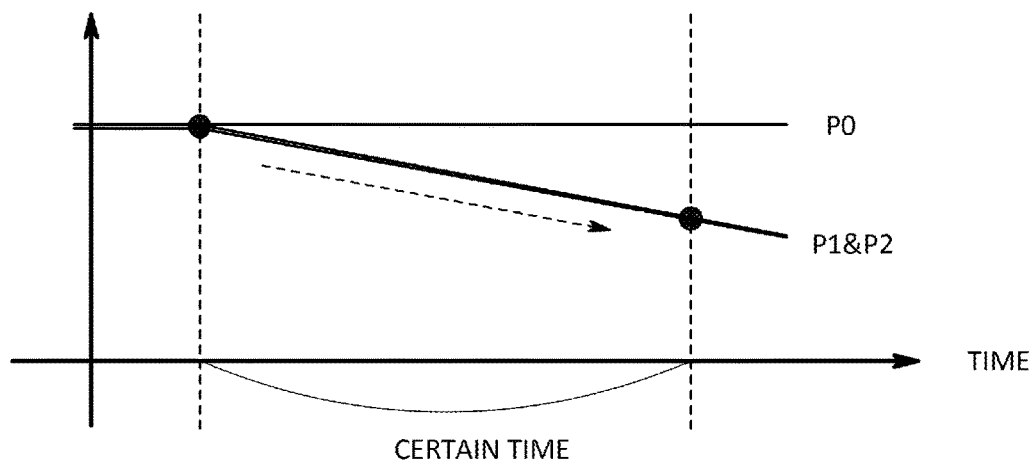
Figure 10:
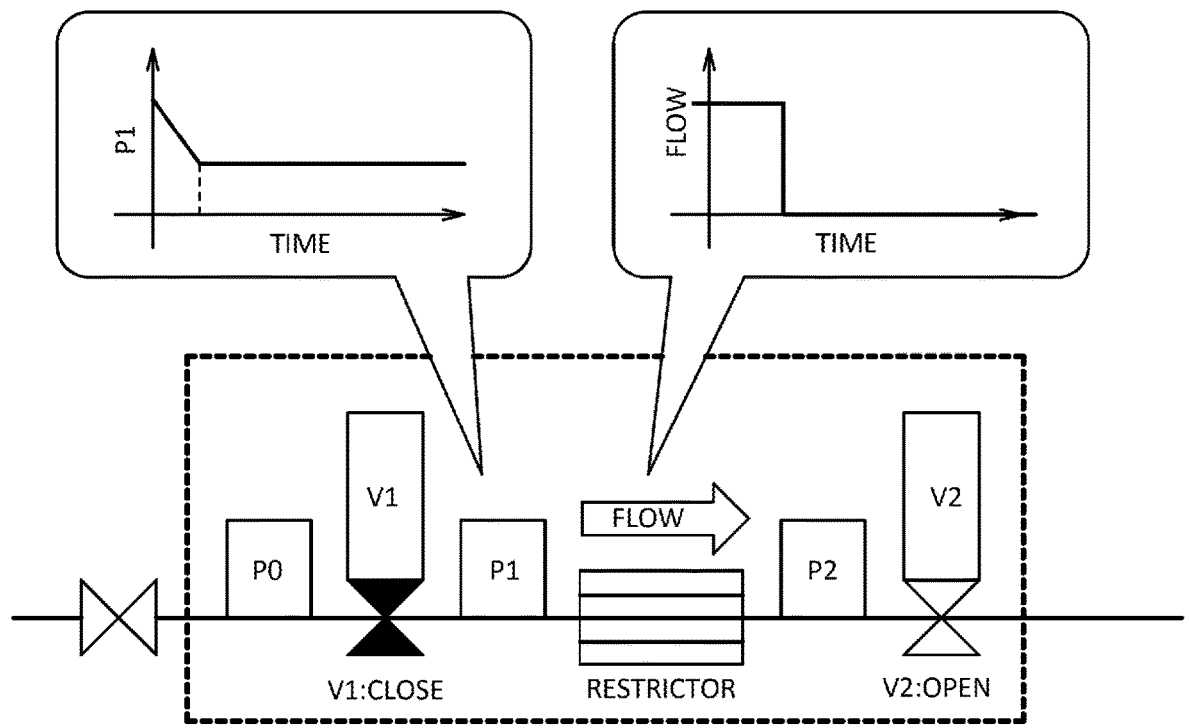
FIG. 10 A pattern diagram showing a state of the fluid control apparatus at a time of testing a resistor flow rate in accordance with the second embodiment.

In case that drop of the measured pressure is detected in the predetermined period as shown in FIG. 9(b), the seat leakage judging part 52 judges that the seat leakage occurs in the second valve (V2) (step ST12). In case that the drop of the measured pressure is not detected in the predetermined period, the seat leakage judging part 52 judges that the seat leakage does not occur in the second valve (V2) (step ST13).

Only in case that no seat leakage occurs in the second valve (V2), the diagnosis trigger 53 permits the subsequent diagnosis to conduct on the resistor flow rate. In this case, the valve controller 4 fully closes the first valve (V1) and opens the second valve (V2) so as to drop the pressure of the gas charged into the volume of the fluid control apparatus 100 (step ST14). The diagnosis part 54 diagnoses the resistor flow rate calculated from the first pressure and the second pressure by the resistor flow rate calculation part 1 based on the pressure drop at a time when the pressure of the gas drops (step ST15). A diagnostic method using the pressure drop may use various known methods such as the ROF method. For example, it is possible to judge whether or not the resistor flow rate is normal by comparing an integrated value of the resistor flow rate with the volume of the gas flowing out from the first volume (VL1) calculated by a gas state equation during a pressure drop period in the first volume (VL1) within the predetermined period.

As mentioned above, also in accordance with the fluid control apparatus 100 of the second embodiment, it is possible to judge whether or not there is the seat leakage in each of the valves. In addition, in the second embodiment, it is possible to diagnose whether or not there is abnormality in the resistor flow rate calculated as the output of the flow rate sensor. If the multiple diagnoses or judgments are conducted by following the steps indicated by the flow chart in FIG. 6, it is possible to efficiently charge the gas into or release the gas from the volume of the fluid control apparatus 100. More specifically, the resistor flow rate can be diagnosed by opening the valve sequentially from the upstream side to the downstream side as described in the flow chart in FIG. 6, and charging the gas into the downstream side of the fluid control apparatus 100, and finally discharging the gas charged into the fluid control apparatus 100 so that the gas can be used without being wasted.

A modified embodiment of the second embodiment will be explained. The judgment whether or not there is the seat leakage in the first valve (V1) and the second valve (V2) may be conducted based on not the change tendency of the first pressure or the second pressure but the difference among the supply pressure measured by the supply pressure sensor (P0), the first pressure or the second pressure, or a change of the difference. More specifically, also in case that the seat leakage occurs in the valve as shown in FIG. 8(b), FIG. 9(b), since the supply pressure measured by the supply pressure sensor (P0) is kept generally constant, it is possible to use the supply pressure as a reference in case of comparing the supply pressure with the first pressure or the second pressure.

The fluid control apparatus 100 in accordance with a third embodiment of this invention will be explained with reference to FIG. 12 and FIG. 13. The same parts as those in the third embodiment are denoted by the same reference numerals as those in the second embodiment. In addition, since mainly a hardware part in FIG. 12 is the same as that in the first embodiment, the hardware part is omitted.

Figure 12:
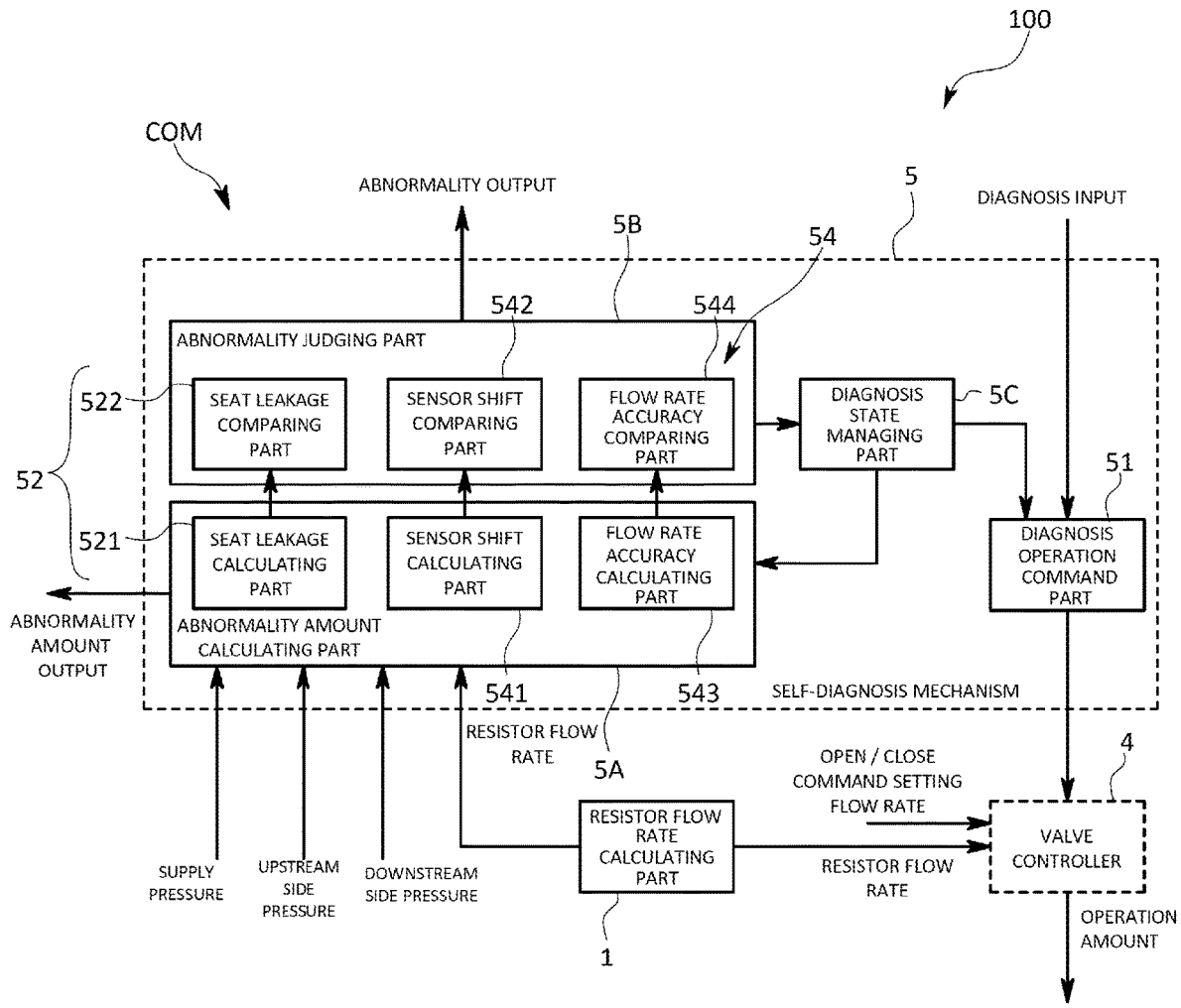
FIG. 12 A pattern block diagram showing a configuration of a self-diagnosis mechanism in accordance with a third embodiment of this invention.

As shown in FIG. 12, the fluid control apparatus 100 in accordance with the third embodiment has a different arrangement of the self-diagnosis mechanism 5 compared with that of the first embodiment. More specifically, the self-diagnosis mechanism 5 receives outputs from the supply pressure sensor (P0), the first pressure sensor (P1), the second pressure sensor (P2) and the resistor flow rate calculating part 1 and calculates an abnormality amount indicating an abnormality progressing degree in each part of the fluid control apparatus 100 based on the pressure measured by the supply pressure sensor (P0), the first pressure sensor (P1) or the second pressure sensor (P2), or the calculated value by the resistor flow rate calculating part 1. In addition, the self-diagnosis mechanism 5 also judges whether or not there is an abnormality in each part of the fluid control apparatus 100 based on the calculated abnormality amount. That there is the abnormality refers to a state wherein the seat leakage or the measurement error occurs to such an extent that it is not possible to secure the desired control accuracy. In addition, that there is no abnormality refers to a state wherein the calculated abnormality amount falls within an allowable value and the desired control accuracy can be secured.

More concretely, the self-diagnosis mechanism 5 comprises an abnormality amount calculating part (5A), an abnormality judging part (5B), a diagnosis state managing part (5C) and a diagnosis operation command part 51. The diagnosis state managing part (5C) corresponds to the diagnosis trigger 53 in the first embodiment, and controls the abnormality amount calculating part (5A) and an operation of the diagnosis operation command part 51 according to the output of the abnormality judging part (5B).

The abnormality calculating part (5A) calculates an abnormality amount indicating a state of each pressure sensor (P0), (P1), (P2), the first valve (V1) and the second valve (V2) based on the supplying pressure output by the supply pressure sensor (P0), an upstream side pressure output by the first pressure sensor (P1) and a downstream side pressure output by the second pressure sensor (P2). Concretely, the abnormality calculating part (5A) comprises a seat leakage calculating part 521, a sensor shift calculating part 541 and a flow rate accuracy calculating part 543.

In addition, the abnormality judging part (5B) compares the abnormality amount calculated by the abnormality calculating part (5A) with a previously determined reference value, and judges whether or not there is the abnormality in each pressure sensor, each valve or the flow rate sensor. Concretely, the abnormality judging part (5B) comprises a seat leakage comparing part 522, a sensor shift comparing part 542 and a flow rate accuracy comparing part 544.

The abnormality amount calculating part (5A) and the abnormality judging part (5B) will be explained in detail.

The seat leakage calculating part 521 calculates the seat leakage amount in the first valve (V1) and the seat leakage amount in the second valve (V2) based on the pressure measured by the first pressure sensor (V1) and the pressure measured by the second pressure sensor (V2) in a state wherein the first valve (V1) and the second valve (V2) are fully closed by the valve controller 4. The seat leakage calculating part 521 calculates a flow rate of the gas flowing in and the flowing out from the first capacity (VL1) and the second capacity (VL2) as the seat leakage amount (sccm) based on a rise amount of the pressure or a drop amount of the pressure and a gas state equation after each valve is fully closed. More specifically, the seat leakage calculating part 521 calculates the seat leakage amount in the first valve (V1) in case of pressure rise, and the seat leakage calculating part 521 calculates the set leakage amount of the second valve (V2) in case of pressure drop.

In addition, the seat leakage comparing part 522 compares the seat leakage amount calculated by the seat leakage calculating part 521 with the reference value and judges that the seat leakage occurs in the first valve (V1) or the second valve (V2) in case that the seat leakage amount exceeds the reference value. The seat leakage calculating part 521 and the seat leakage comparing part 522 correspond to the seat leakage judging part 52 in the second embodiment.

The sensor shift calculating part 541 calculates a zero point shift amount of each pressure sensor based on the pressure measured by the first pressure sensor (P1) and the pressure measured by the second pressure sensor (P2) in a state wherein the first valve (V1) and the second valve (V2) are fully open by the valve controller 4. The sensor shift comparing part 542 compares the zero point amount calculated by the sensor shift calculating part 541 with the reference amount and outputs that the abnormality occurs in the first pressure sensor (P1) or the second pressure sensor (P2) in case that the zero point shift amount exceeds the reference value.

The flow rate accuracy calculating part 543 calculates a difference between the flow rate calculated based on a measured value of the first pressure sensor (P1) or a measured value of the second pressure sensor (P2) by the use of, for example, the ROR method and a resistor flow rate calculated by the resistor flow rate calculating part 1 while the ROR method is conducted as a flow rate accuracy. The flow rate accuracy comparing part 544 compares the flow rate accuracy calculated by the flow rate accuracy calculating part 543 with the reference value and outputs that the abnormality occurs to the flow rate sensor (F) in case that the flow rate accuracy exceeds the reference value. The sensor shift calculating part 541, the sensor shift comparing part 542, the flow rate accuracy calculating part 543 and flow rate accuracy comparing part 544 correspond to the diagnosis part 54 in the second embodiment.

Figure 13:
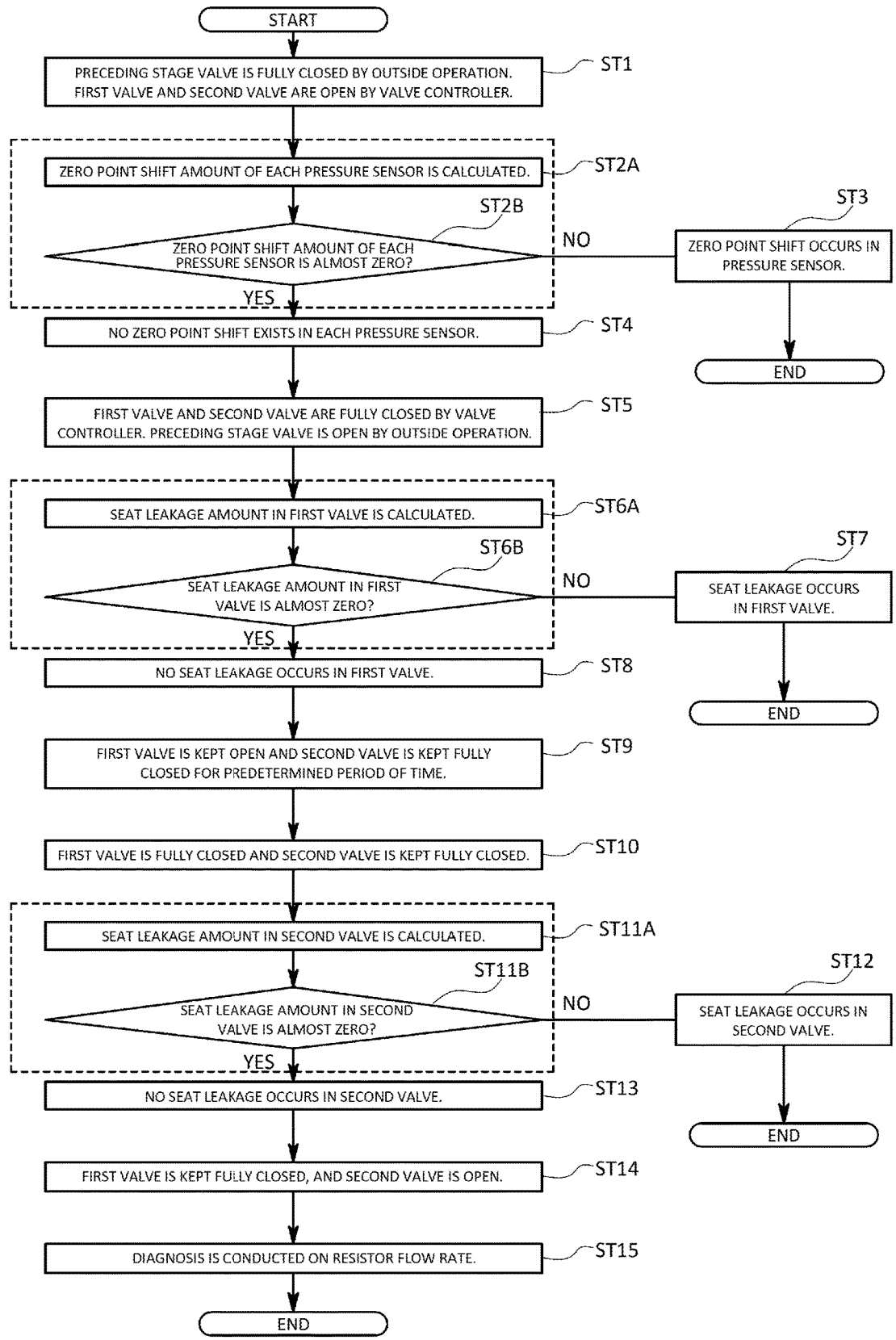
FIG. 13 A flow chart showing a diagnosis and judging process in accordance with the third embodiment of this invention.

A diagnosis operation in accordance with the third embodiment is shown in a flow chart in FIG. 13. The flow chart in FIG. 13 is different from the flow chart in FIG. 6 showing the diagnosis operation in the second embodiment in the operation in the step (ST2), the step (ST6) and the step (ST11). Concretely, a part surrounded by a frame of a broken line in FIG. 13 is different. Concretely, after the completion of the step (ST1), the abnormality amount calculating part (5A) calculates a zero point shift amount of each pressure sensor based on the pressure measured by the first pressure sensor (P1) and the pressure measured by the second pressure sensor (P2) (step (ST2A)). Next, the abnormality judging part (5B) judges whether or not there is the zero point shift based on that the calculated zero point shift amount does not exceed the reference value and the zero point shift amount is nearly zero (step (ST2B)).

In addition, after completion of the step (ST5) and the step (ST10), the abnormality amount calculating part 5A calculates the seat leakage amount in the first valve (V1) and the seat leakage amount in the second valve (V2) respectively (step (ST6A)), step (ST11A)). Next, the abnormality judging part (5B) judges whether or not there is the seat leakage based on that the calculated seat leakage amount does not exceed the reference value and whether or not the seat leakage amount is nearly zero (step (ST6B)), step (ST11B)).

In accordance with the fluid control apparatus 100 of the third embodiment, it is possible for the abnormality calculating part (5A) to calculate the abnormality amount indicating the abnormality progressing degree of each pressure sensor and each valve and to judge whether or not there is the zero point shift or the seat leakage in accordance with the value of the abnormality.

Figure 14:
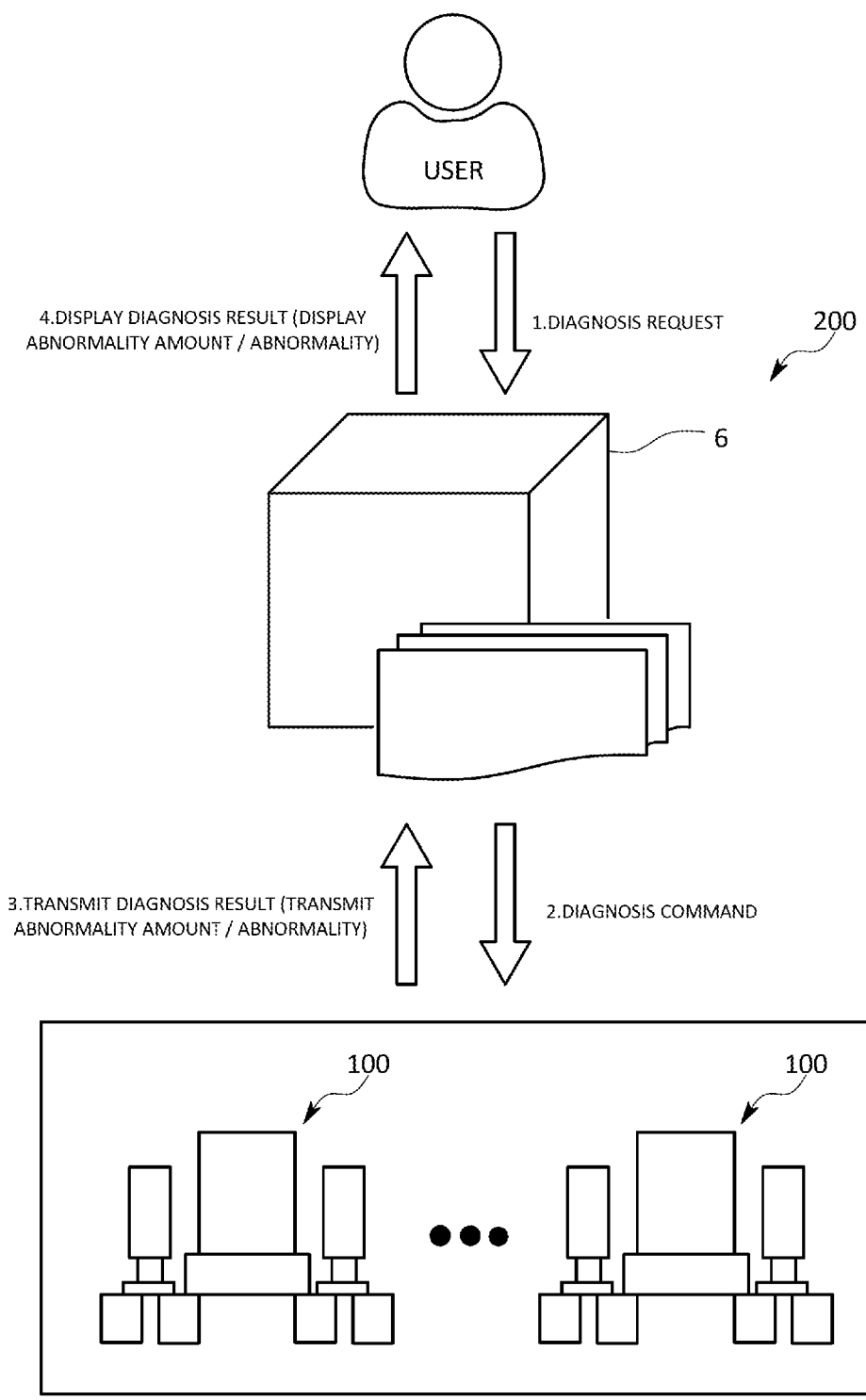
FIG. 14 A pattern diagram showing a fluid control system in accordance with a fourth embodiment of this invention.

Next, a fluid control system 200 in accordance with a fourth embodiment will be explained. As shown in FIG. 14, the fluid control system 200 of the fourth embodiment comprises multiple fluid control apparatuses 100 of the third embodiment and an integrated control apparatus 6 that controls at least the diagnosis of each fluid control apparatus 100.

When the integrated control apparatus 6 receives a diagnosis request from a user, each of the fluid control apparatuses 100 inputs a diagnosis input to the diagnosis operation command part 51. Each of the fluid control apparatuses 100 conducts a self-diagnosis on each valve or each sensor by the use of the self-diagnosis mechanism 5 by the operation explained in the above-mentioned embodiment. The abnormality amount output by the abnormality amount calculating part 5A of each fluid control apparatus 100 and the data concerning whether or not there is the abnormality output by the abnormality judging part 5B of each fluid control apparatus 10 are transmitted to the integrated control apparatus 6. The integrated control apparatus 6 also produces a function as a state displaying part that lists the abnormality amount and whether or not there is the abnormality received from each fluid control apparatus 100 to the user.

In accordance with the fluid control system 200 of the fourth embodiment, even though the fluid control system 200 comprises the multiple fluid control apparatuses 100, it is possible for the user to immediately know the abnormality occurs in which of the fluid control apparatuses 100 or which part of the fluid control apparatus in which the abnormality occurs. In addition, since the abnormality amount to be a determination basis of the abnormality judgment is displayed also for a device having no abnormality, it is possible for the user to anticipate a progressing degree of the abnormality.

Other embodiment will be explained.

The seat leakage judging part may judge whether or not there is the seat leakage based on the change tendency of the pressure measured by either one of the first pressure sensor and the second pressure sensor. For example, the time after a predetermined time passes until the pressures in the first volume and the second volume are stabilized from when the first valve and the second valve are closed may be set as a judgment initiation time. Thereafter, only either one of the pressures measured by the first pressure sensor and the second pressure sensor may be monitored. In addition, the change tendency of the measured pressure may use various calculation methods such as calculating a time change rate and calculating a differential value. In addition, whether or not the seat leakage occurs in the first valve or the second valve may be judged based on an absolute value of a difference between the measured pressure at a time of initiating the judgment and the measured pressure at a time when a predetermined time passes from the initiation of the judgment or positive or negative of the difference. For example, in case that the pressure measured by the first pressure sensor at the time of initiating judgment is bigger than the pressure measured by the first pressure sensor at the time when the predetermined time passes from the initiation of the judgment, the seat leakage judging part judges the seat leakage occurs in the first valve. On the contrary, in case that the pressure measured by the second pressure sensor at the time of initiating judgment is smaller than the pressure measured by the second pressure sensor at the time when the predetermined time passes from the initiation of the judgment, the seat leakage judging part judges the seat leakage occurs in the second valve.

The diagnosis part may first diagnose the first pressure sensor and then the second pressure sensor. In addition, in order to diagnose the first pressure sensor, only the pressures measured by the first pressure sensor and the second pressure sensor may be used without using the pressure measured by the supply pressure sensor. In addition, the diagnosis of the pressure sensor is not limited to the zero point shift, and other error may be diagnosed. In addition, in the above-mentioned embodiment, the seat leakage check is conducted and both the first valve and the second valve are diagnosed in case that the seat leakage does not occur in both the first valve and the second valve, however, both the first valve and the second valve may be diagnosed on a constant basis irrespective of the check result of the seat leakage. In addition, the first sensor and the second sensor may be diagnosed independently without conducting the seat leakage check.

The fluid resistor is not limited to the laminar flow element and may be a dividing flow element used for a thermal type flow rate sensor.

The function of the seat leakage judging part, the diagnosis part or the self-diagnosis mechanism is not limited to be realized by an arithmetic unit such as a computer or a control board incorporated into a fluid control apparatus, and may be realized by a general computer arranged separately from the fluid control apparatus.

The open degree controller described in the second embodiment controls open/close of the first valve and the second valve, however, it may control also open/close of the preceding step valve arranged outside of the fluid control apparatus.

In addition, the embodiment may be modified and a part or all of each embodiment may be combined without departing from a spirit of this invention.

DESCRIPTION OF THE REFERENCE CHARACTERS

100 . . . fluid control apparatus
V1 . . . first valve
P1 . . . first pressure sensor
R . . . fluid resistor
VL1 . . . first volume
VL2 . . . second volume
P2 . . . second pressure sensor
V2 . . . second valve
F . . . fluid measuring mechanism
1 . . . resistor flow rate calculation part
42 . . . second valve control part
5 . . . self-diagnosis mechanism
51 . . . diagnosis operation command part
52 . . . seat leakage judging part
53 . . . diagnosis trigger
54 . . . diagnosis part

The invention claimed is:
1. A fluid control apparatus comprising:
a fluid resistor arranged in a flow channel,
a first valve arranged in an upstream side of the fluid resistor,
a first pressure sensor that measures a pressure in a first volume between the first valve and the fluid resistor in the flow channel,
a second valve arranged in a downstream side of the fluid resistor,
a second pressure sensor that measures a pressure in a second volume between the fluid resistor and the second valve in the flow channel,
a valve controller that controls the first valve or the second valve, and
a seat leakage judging part that judges whether or not there is a seat leakage in the first valve and the second valve based on a pressure measured by the first pressure sensor and a pressure measured by the second pressure sensor in a state wherein the first valve and the second valve are fully closed by the valve controller, wherein
the seat leakage judging part judges whether or not there is the seat leakage in the first valve and the second valve based on a time change of the pressure measured by the first pressure sensor or measured by the second pressure sensor after the pressure measured by the first pressure sensor generally coincides with the pressure measured by the second pressure sensor,
the seat leakage judging part is configured to judge that the seat leakage occurs, if the time change of the pressure measured by the first pressure sensor or the second pressure sensor shows that a rise in pressure or a drop in pressure continues to occur after the pressure measured by the first pressure sensor generally coincides with the pressure measured by the second pressure sensor, and
the seat leakage judging part comprises:
a seat leakage calculating part that calculates a seat leakage amount in the first valve or a seat leakage amount in the second valve based on the pressure measured by the first pressure sensor or the pressure measured by the second pressure sensor, and
a seat leakage comparing part that compares the seat leakage amount calculated by the seat leakage calculating part with a previously determined reference value and that outputs a judging result whether or not there is the seat leakage in the first valve or in the second valve.
2. The fluid control apparatus described in claim 1, wherein
the seat leakage judging part judges that the seat leakage occurs in the first valve in case that the time change of the pressure measured by the first pressure sensor or the second pressure sensor shows the rise in pressure.

3. The fluid control apparatus described in claim 1, wherein
the seat leakage judging part judges that the seat leakage occurs in the second valve in case that the time change of the pressure measured by the first pressure sensor or the second pressure sensor shows the drop in pressure.

4. The fluid control apparatus described in claim 1, further comprising:
a diagnosis part that diagnoses the second pressure sensor based on the pressure measured by the second pressure sensor and a time change rate of the measured pressure in a state wherein the first valve is fully closed and the second valve is open by the valve controller.

5. The fluid control apparatus described in claim 4, wherein
the diagnosis part diagnoses that a zero point shift does not occur in the second pressure sensor in case that both the time change rate of the pressure measured by the second pressure sensor is almost zero and the measured pressure is kept at a predetermined value.

6. The fluid control apparatus described in claim 4, wherein
the diagnosis part diagnoses the first pressure sensor based on the pressure measured by the first pressure sensor and the pressure measured by the second pressure sensor in a state wherein the first valve is open and the second valve is fully closed by the valve controller.

7. The fluid control apparatus described in claim 6, wherein
the diagnosis part diagnoses that a zero point shift does not occur in the first pressure sensor in case that the pressure measured by the first pressure sensor is almost equal to the pressure measured by the second pressure sensor.

8. The fluid control apparatus described in claim 4, further comprising:
a diagnosis trigger that makes the diagnosis part conduct a diagnosis on the first pressure sensor or the second pressure sensor only in case that the seat leakage judging part judges that no seat leakage occurs in the first valve and the second valve.

9. The fluid control apparatus described in claim 4, further comprising:
a supply pressure sensor that measures a pressure in an upstream side of the first valve, wherein
in a state wherein at least the first valve and the second valve are open and a preceding stage valve arranged in an upstream side of the supply pressure sensor is fully closed by the valve controller,
the diagnosis part diagnoses that the zero point shift does not occur in each of the supply pressure sensor, the first pressure sensor and the second pressure sensor in case that each of the pressures measured by the supply pressure sensor, the first pressure sensor and the second pressure sensor is almost the same.

10. The fluid control apparatus described in claim 9, wherein
in a state wherein at least the first valve and the second valve are fully closed and the preceding stage valve is open by the valve controller,
the seat leakage judging part judges that the seat leakage occurs in the first valve in case that the pressure measured by the first pressure sensor or measured by the second pressure sensor rises.

11. The fluid control apparatus described in claim 10, wherein
in a state wherein the first valve and the second valve are fully closed after a predetermined time period while the first valve is open and the second valve is fully closed by the valve controller,
the seat leakage judging part judges that the seat leakage occurs in the second valve in case that the pressure measured by the first pressure sensor or measured by the second pressure sensor drops.

12. The fluid control apparatus described in claim 11, further comprising:
a resistor flow rate calculation part that calculates a resistor flow rate as being a flow rate of a fluid that flows in the fluid resistor based on the pressure measured by the first pressure sensor and the pressure measured by the second pressure sensor, wherein
in a state wherein the first valve is fully closed and the second valve is open by the valve controller, the diagnosis part examines the resistor flow rate calculated by the resistor flow rate calculation part based on the change of the pressure measured by the first pressure sensor.

13. The fluid control apparatus described in claim 1, wherein
the fluid control apparatus further comprises:
an abnormality amount calculating part that comprises at least the seat leakage calculating part and that outputs an abnormality amount indicating a degree of the abnormality, and
an abnormality judging part that comprises at least the seat leakage comparing part and that outputs whether or not there is the abnormality.

14. The fluid control apparatus described in claim 13, further comprising:
a resistor flow rate calculating part that calculates a resistor flow rate as being a flow rate of a fluid flowing in the fluid resistor based on the pressure measured by the first pressure sensor and the pressure measured by the second pressure sensor, wherein
the abnormality calculating part further comprises:
a sensor shift calculating part that calculates a zero point shift amount of the first pressure sensor or a zero point shift amount of the second pressure sensor based on the pressure measured by the first pressure sensor or the pressure measured by the second pressure sensor, and
a flow rate accuracy calculating part that calculates a flow rate accuracy of the resistor flow rate based on the resistor flow rate calculated by the resistor flow rate calculating part and the reference flow rate calculated from the pressure measured by the first pressure sensor or the pressure measured by the second pressure sensor.

15. A fluid control system comprising:
multiple fluid control apparatuses described in claim 14, and
a state displaying part that obtains the abnormality amount output by each of the abnormality amount calculating parts of the multiple fluid control apparatuses or that obtains whether or not there is the abnormality output by each of the abnormality judging parts and that lists the abnormality amount for each of the fluid control apparatuses or whether or not there is the abnormality for each of the fluid control apparatuses.

16. A diagnostic method of a fluid control apparatus comprising a fluid resistor arranged in a flow channel, a first valve arranged in an upstream side of the fluid resistor, a first pressure sensor that measures a pressure in a first volume between the first valve and the fluid resistor in the flow channel, a second valve arranged in a downstream side of the fluid resistor, and a second pressure sensor that measures a pressure in a second volume between the fluid resistor and the second valve in the flow channel, the method comprising:
- a valve control step to fully close the first valve and the second valve, and
- a seat leakage judging step to judge where or not there is a seat leakage in the first valve and the second valve based on a pressure measured by the first pressure sensor and a pressure measured by the second pressure sensor, wherein
- the seat leakage judging step judges whether or not there is the seat leakage in the first valve and the second valve based on a time change of the pressure measured by the first pressure sensor or measured by the second pressure sensor after the pressure measured by the first pressure sensor generally coincides with the pressure measured by the second pressure sensor,
- the seat leakage judging step judges that the seat leakage occurs, if the time change of the pressure measured by the first pressure sensor or the second pressure sensor shows that a rise in pressure or a drop in pressure continues to occur after the pressure measured by the first pressure sensor generally coincides with the pressure measured by the second pressure sensor, and
- the seat leakage judging step further comprises:
  - a seat leakage calculating step that calculates a seat leakage amount in the first valve or a seat leakage amount in the second valve based on the pressure measured by the first pressure sensor or the pressure measured by the second pressure sensor, and
  - a seat leakage comparing step that compares the seat leakage amount calculated by the seat leakage calculating step with a previously determined reference value and that outputs a judging result whether or not there is the seat leakage in the first valve or in the second valve.

17. A program recording medium that records programs used for a fluid control apparatus comprising a fluid resistor arranged in a flow channel, a first valve arranged in an upstream side of the fluid resistor, a first pressure sensor that measures a pressure in a first volume between the first valve and the fluid resistor in the flow channel, a second valve arranged in a downstream side of the fluid resistor, and a second pressure sensor that measures a pressure in a second volume between the fluid resistor and the second valve in the flow channel, the programs making a computer serve as functions of:
- a valve controller that controls the first valve and the second valve, and
- a seat leakage judging part that judges whether or not there is a seat leakage in the first valve or the second valve based on a pressure measured by the first pressure sensor and a pressure measured by the second pressure sensor in a state wherein the first valve and the second valve are fully closed by the valve controller, wherein
- the seat leakage judging part judges whether or not there is the seat leakage in the first valve and the second valve based on a time change of the pressure measured by the first pressure sensor or measured by the second pressure sensor after the pressure measured by the first pressure sensor generally coincides with the pressure measured by the second pressure sensor,
- the seat leakage judging part is configured to judge that the seat leakage occurs, if the time change of the pressure measured by the first pressure sensor or the second pressure sensor shows that a rise in pressure or a drop in pressure continues to occur after the pressure measured by the first pressure sensor generally coincides with the pressure measured by the second pressure sensor, and
- the seat leakage judging part comprises:
  - a seat leakage calculating part that calculates a seat leakage amount in the first valve or a seat leakage amount in the second valve based on the pressure measured by the first pressure sensor or the pressure measured by the second pressure sensor, and
  - a seat leakage comparing part that compares the seat leakage amount calculated by the seat leakage calculating part with a previously determined reference value and that outputs a judging result whether or not there is the seat leakage in the first valve or in the second valve.

18. A fluid control apparatus comprising:
- a fluid resistor arranged in a flow channel,
- a first valve arranged in an upstream side of the fluid resistor,
- a first pressure sensor that measures a pressure in a first volume between the first valve and the fluid resistor in the flow channel,
- a second valve arranged in a downstream side of the fluid resistor,
- a second pressure sensor that measures a pressure in a second volume between the fluid resistor and the second valve in the flow channel,
- a valve controller that controls the first valve or the second valve,
- a seat leakage judging part that judges whether or not there is a seat leakage in the first valve and the second valve based on a pressure measured by the first pressure sensor and a pressure measured by the second pressure sensor in a state wherein the first valve and the second valve are fully closed by the valve controller, and
- a diagnosis part that diagnoses:
  - the second pressure sensor based on the pressure measured by the second pressure sensor and a time change rate of the measured pressure in a state wherein the first valve is fully closed and the second valve is open by the valve controller; or
  - the first pressure sensor based on the pressure measured by the first pressure sensor and the pressure measured by the second pressure sensor in a state wherein the first valve is open and the second valve is fully closed by the valve controller.

19. A fluid control apparatus comprising:
- a fluid resistor arranged in a flow channel,
- a first valve arranged in an upstream side of the fluid resistor,
- a first pressure sensor that measures a pressure in a first volume between the first valve and the fluid resistor in the flow channel,
- a second valve arranged in a downstream side of the fluid resistor,
- a second pressure sensor that measures a pressure in a second volume between the fluid resistor and the second valve in the flow channel,
- a valve controller that controls the first valve or the second valve,
- a seat leakage judging part that judges whether or not there is a seat leakage in the first valve and the second valve based on a pressure measured by the first pressure sensor and a pressure measured by the second pressure sensor in a state wherein the first valve and the second valve are fully closed by the valve controller, a resistor flow rate calculation part that calculates a resistor flow rate as being a flow rate of a fluid that flows in the fluid resistor based on the pressure measured by the first pressure sensor and the pressure measured by the second pressure sensor, and a diagnosis part configured to examine the resistor flow rate calculated by the resistor flow rate calculation part, wherein the diagnosis part examines the resistor flow rate based on the change of the pressure measured by the first pressure sensor in a state wherein the first valve is fully closed and the second valve is open by the valve controller.

* * * * *